US012700223B2

(12) United States Patent
    Kurasawa

(10) Patent No.: US 12,700,223 B2
(45) Date of Patent: Aug. 4, 2026

(54) METHOD OF EXTRACTING UNSUITABLE AND DEFECTIVE DATA FROM PLURALITY OF PIECES OF TRAINING DATA USED FOR LEARNING OF MACHINE LEARNING MODEL, INFORMATION PROCESSING DEVICE, AND NON-TRANSITORY COMPUTER-READABLE STORAGE MEDIUM STORING COMPUTER PROGRAM

(71) Applicant: SEIKO EPSON CORPORATION, Tokyo (JP)

(72) Inventor: Hikaru Kurasawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 893 days.

(21) Appl. No.: 18/058,281

(22) Filed: Nov. 23, 2022

(65) Prior Publication Data

US 2023/0162489 A1 May 25, 2023

(30) Foreign Application Priority Data

Nov. 24, 2021 (JP) .................................. 2021-189881

(51) Int. Cl.
    *G06V 10/58* (2022.01)
    *G06V 10/774* (2022.01)

(52) U.S. Cl.
    CPC .......... *G06V 10/7747* (2022.01); *G06V 10/58* (2022.01)

(58) Field of Classification Search
    CPC ............. G06V 10/774; G06V 10/7747; G06V 10/454; G06V 10/70; G06V 10/7635; G06N 3/0464; G06N 3/04; G06N 20/00; G06T 2207/20081
    See application file for complete search history.

(56) References Cited

U.S. PATENT DOCUMENTS

| | | | |
|---|---|---|---|
| 5,210,798 A | 5/1993 | Ekchian et al. | |
| 2022/0405605 A1* | 12/2022 | Yokoyama | ................. G06T 7/00 |
| 2023/0027069 A1* | 1/2023 | Hinton | ................. G06N 3/0464 |

FOREIGN PATENT DOCUMENTS

| | | |
|---|---|---|
| JP | 2015064628 A | 4/2015 |
| JP | 2019215698 A | 12/2019 |
| WO | 2019083553 A1 | 5/2019 |

OTHER PUBLICATIONS

Fujino et al., "Recognition of Foodstuffs in Cooking Process Image", IEICE, Technical Report, 2017, 24 pages.
Office Action for JP Patent Application No. 2021189881, issued on Jul. 8, 2025, 8 pages.

* cited by examiner

*Primary Examiner* — Sumati Lefkowitz
*Assistant Examiner* — Michael Adam Shariff
(74) *Attorney, Agent, or Firm* — CHIP LAW GROUP

(57) ABSTRACT

A method according to the present disclosure includes selecting a reference class from a plurality of classes, calculating a plurality of degrees of similarity between a feature spectrum corresponding to target training data and a plurality of the feature spectra belonging to the reference class, applying, to the plurality of degrees of similarity, a defectiveness function that is determined in advance, and calculating a defectiveness index with respect to the target training data, and determining whether the target training data is the defective data, based on a result of comparison between the defectiveness index and a threshold value.

15 Claims, 15 Drawing Sheets

GSp

| LAYER | PARTIAL REGION k | CLASS c | DATA NUMBER q | FEATURE SPECTRUM Sp | |
|-------|-----------|---------|-----------|---------------------|---|
| ConvVN2 | 1 | 1 | 1 | ································· | |
| ... | ... | ... | ... | ································· | |
| ConvVN2 | 1 | 1 | max1 | ································· | |
| ... | ... | ... | ... | ································· | c=1 |
| ConvVN2 | 9 | 1 | 1 | ································· | |
| ... | ... | ... | ... | ································· | |
| ConvVN2 | 9 | 1 | max1 | ································· | |
| ConvVN2 | 1 | 2 | 1 | ································· | |
| ... | ... | ... | ... | ································· | |
| ConvVN2 | 1 | 2 | max2 | ································· | |
| ... | ... | ... | ... | ································· | c=2 |
| ConvVN2 | 9 | 2 | 1 | ································· | |
| ... | ... | ... | ... | ································· | |
| ConvVN2 | 9 | 2 | max2 | ································· | |

FIG. 6

$S_q^{c,c'}$ for Normal Learning Data

Frequency $S_q^c$ 1.0

<THIRD ARITHMETIC METHOD M3>

DEGREE OF SIMILARITY $S_q^c$

| SPECIFIC LAYER | ConvVN2 |
|---|---|
| CLASS c' = 2 | 0.93 |

$$S_q^c = \max[G\{Sp(k=all, c, q), Sp(k'=all, c', q')\}]$$

METHOD OF EXTRACTING UNSUITABLE AND DEFECTIVE DATA FROM PLURALITY OF PIECES OF TRAINING DATA USED FOR LEARNING OF MACHINE LEARNING MODEL, INFORMATION PROCESSING DEVICE, AND NON-TRANSITORY COMPUTER-READABLE STORAGE MEDIUM STORING COMPUTER PROGRAM

The present application is based on, and claims priority from JP Application Serial Number 2021-189881, filed Nov. 24, 2021, the disclosure of which is hereby incorporated by reference herein in its entirety.

BACKGROUND

1. Technical Field

The present disclosure relates to a method of extracting unsuitable and defective data from a plurality of pieces of training data used for learning of a machine learning model, an information processing device, and a non-transitory computer-readable storage medium storing a computer program.

2. Related Art

U.S. Pat. No. 5,210,798 and WO 2019/083553 each disclose a so-called capsule network as a machine learning model of a vector neural network type using a vector neuron. The vector neuron indicates a neuron where an input and an output are in a vector expression. The capsule network is a machine learning model where the vector neuron called a capsule is a node of a network. The vector neural network-type machine learning model such as a capsule network is applicable to input data classification processing.

In general, training data used for learning of the machine learning model may contain unsuitable and defective data such as outlier data and overlap data. The outlier data is data significantly different from characteristics of a normal training data set in general. The overlap data is data having features significantly similar to those of normal training data in a different class. It has been known that, when defective data is present in training data, learning or verification of the machine learning model do not properly proceed. In view of this, there has been demanded a technique of extracting defective data contained in a plurality of pieces of leaning data.

SUMMARY

According to a first aspect of the present disclosure, there is provided a method for extracting unsuitable and defective data from a plurality of pieces of training data used for learning of a machine learning model for classifying input data into a plurality of classes. The machine learning model is configured as a vector neural network having a plurality of vector neuron layers. The method includes (a) inputting each of the plurality of pieces of training data into the machine learning model that is previously leaned, obtaining a feature spectrum from an output of a specific layer of the machine learning model, and classifying, into classes, the feature spectra corresponding respectively to the plurality of pieces of training data, and (b) selecting target training data from the plurality of pieces of training data, and determining whether the target training data is the defective data. (b) includes (b1) selecting a reference class from the plurality of classes, (b2) calculating a plurality of degrees of similarity

2 between the feature spectrum corresponding to the target training data and a plurality of the feature spectra belonging to the reference class, (b3) applying, to the plurality of degrees of similarity, a defectiveness function that is determined in advance, and calculating a defectiveness index with respect to the target training data, and (b4) determining whether the target training data is the defective data, based on a result of comparison between the defectiveness index and a threshold value.

According to a second aspect of the present disclosure, there is provided an information processing device configured to execute processing for extracting unsuitable and defective data from a plurality of pieces of training data used for learning of a machine learning model for classifying input data into a plurality of classes. The information processing device includes a memory configured to store a machine learning model configured as a vector neural network having a plurality of vector neuron layers, and a processor configured to execute an arithmetic operation using the machine learning model. The processor executes processing of (a) inputting each of the plurality of pieces of training data into the machine learning model that is previously leaned, obtaining a feature spectrum from an output of a specific layer of the machine learning model, and classifying, into classes, the feature spectra corresponding respectively to the plurality of pieces of training data, and (b) selecting target training data from the plurality of pieces of training data, and determining whether the target training data is the defective data. (b) includes (b1) selecting a reference class from the plurality of classes, (b2) calculating a plurality of degrees of similarity between the feature spectrum corresponding to the target training data and a plurality of the feature spectra belonging to the reference class, (b3) applying, to the plurality of degrees of similarity, a defectiveness function that is determined in advance, and calculating a defectiveness index with respect to the target training data, and (b4) determining whether the target training data is the defective data, based on a result of comparison between the defectiveness index and a threshold value.

According to a third aspect of the present disclosure, there is provided a non-transitory computer-readable storage medium storing a computer program for causing a processor to execute processing of extracting unsuitable and defective data from a plurality of pieces of training data used for learning of a machine learning model for classifying input data into a plurality of classes. The computer program causes the processor to execute processing of (a) inputting each of the plurality of pieces of training data into the machine learning model that is previously leaned, obtaining a feature spectrum from an output of a specific layer of the machine learning model, and classifying, into classes, the feature spectra corresponding respectively to the plurality of pieces of training data, and (b) selecting target training data from the plurality of pieces of training data, and determining whether the target training data is the defective data. (b) includes (b1) selecting a reference class from the plurality of classes, (b2) calculating a plurality of degrees of similarity between the feature spectrum corresponding to the target training data and a plurality of the feature spectra belonging to the reference class, (b3) applying, to the plurality of degrees of similarity, a defectiveness function that is determined in advance, and calculating a defectiveness index with respect to the target training data, and (b4) determining whether the target training data is the defective data, based on a result of comparison between the defectiveness index and a threshold value.

BRIEF DESCRIPTION OF THE DRAWINGS

FIG. 6 is an explanatory diagram illustrating a configuration of a feature spectrum group.

FIG. 15 is an explanatory diagram illustrating a third arithmetic method for obtaining a degree of similarity.

DESCRIPTION OF EXEMPLARY EMBODIMENTS

A. Exemplary Embodiment

Figure 1:
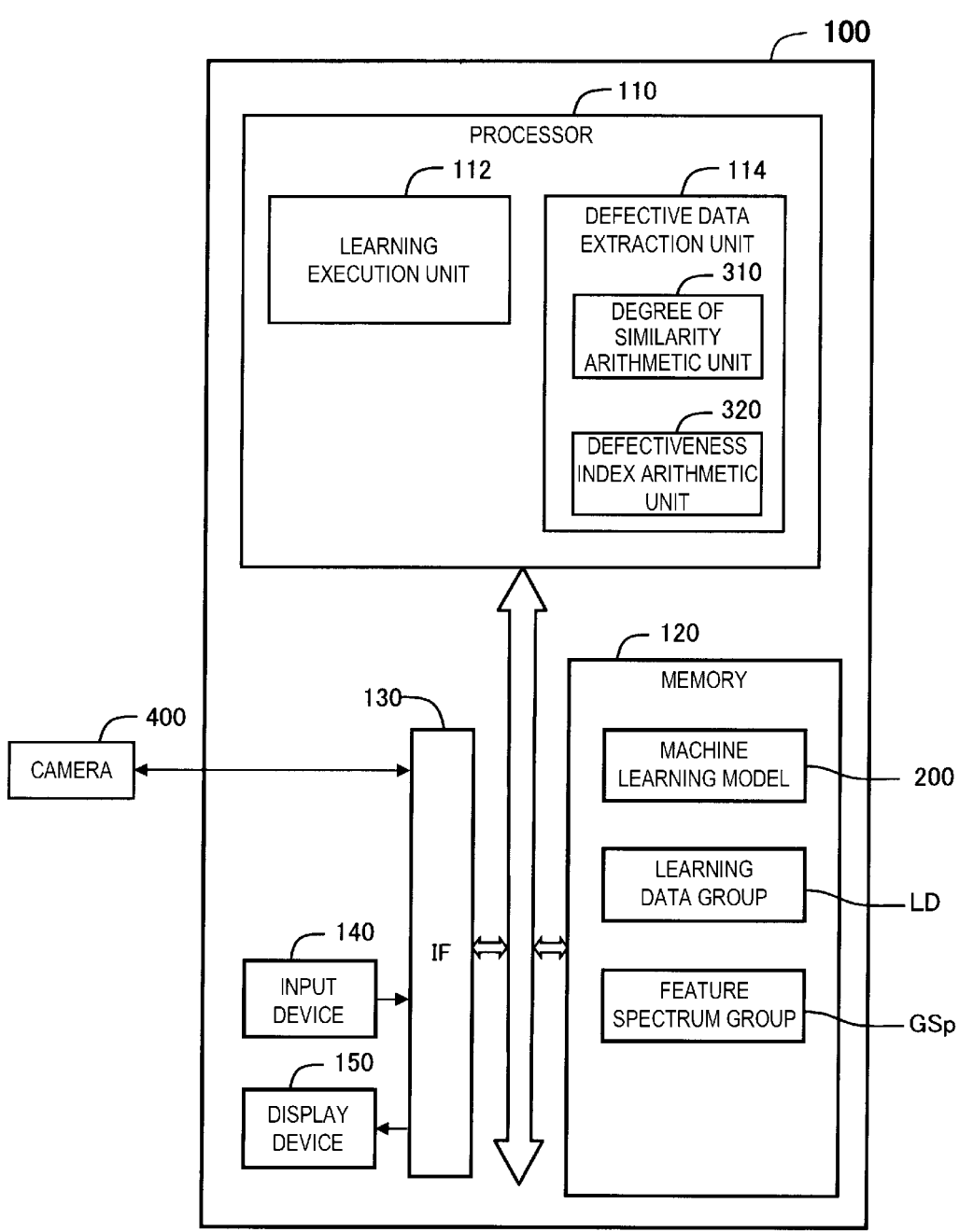
FIG. 1 is a block diagram illustrating a classification processing system in an exemplary embodiment.

FIG. 1 is a block diagram illustrating a classification processing system in an exemplary embodiment. The classification processing system includes an information processing device 100 and a camera 400. The camera 400 captures an image being training data. A camera that captures a color image may be used as the camera 400. Alternatively, a camera that captures a monochrome image or a spectral image may be used. In the present exemplary embodiment, an image captured by the camera 400 is used as the training data. Alternatively, data other than an image may be used as the training data. In such a case, a training data reading device selected in accordance with a data type is used in place of the camera 400.

In the present disclosure, the term "training data" is used as a term indicating both training data and verification data. The training data is labeled data used for adjusting an internal parameter of a machine learning model. The verification data is labeled data used for verifying a machine learning model that is previously learned. However, in the exemplary embodiment described below, description is made on a case in which the training data is used as the training data and defective data is extracted or detected from the training data. The "defective data" may contain outlier data and overlap data. The outlier data is data significantly different from characteristics of a normal training data set in general. The overlap data is data having features significantly similar to those of normal training data in a different class.

The information processing device 100 includes a processor 110, a memory 120, an interface circuit 130, and an input device 140 and a display device 150 that are coupled to the interface circuit 130. The camera 400 is also coupled to the interface circuit 130. Although not limited thereto, for example, the processor 110 is provided with a function of executing processing, which is described below in detail, as well as a function of displaying, on the display device 150, data obtained through the processing and data generated in the course of the processing.

The processor 110 functions as a learning execution unit 112 that executes learning of a machine learning model and a defective data extraction unit 114 that executes processing of extracting defective data from training data. The defective data extraction unit 114 includes a degree of similarity arithmetic unit 310 and a defectiveness index arithmetic unit 320. Each of the learning execution unit 112 and the defective data extraction unit 114 are implemented when the processor 110 executes a computer program stored in the memory 120. Alternatively, the learning execution unit 112 and the defective data extraction unit 114 may be implemented with a hardware circuit. The processor in the present disclosure is a term including such a hardware circuit. Further, one or a plurality of processors that execute learning processing or defective data extraction processing may be a processor included in one or a plurality of remote computers that are coupled via a network.

In the memory 120, a machine learning model 200, a training data group LT, and a feature spectrum group GSp are stored. A configuration example and an operation of the machine learning model 200 are described later. The training data group LT is a group of labeled data used for learning of the machine learning model 200. In the present exemplary embodiment, the training data group LT is a set of image data as the training data. The feature spectrum group GSp is a set of feature spectra that are obtained by inputting training data being a processing target into the machine learning model 200 that is previously leaned. The feature spectrum is described later.

Figure 2:
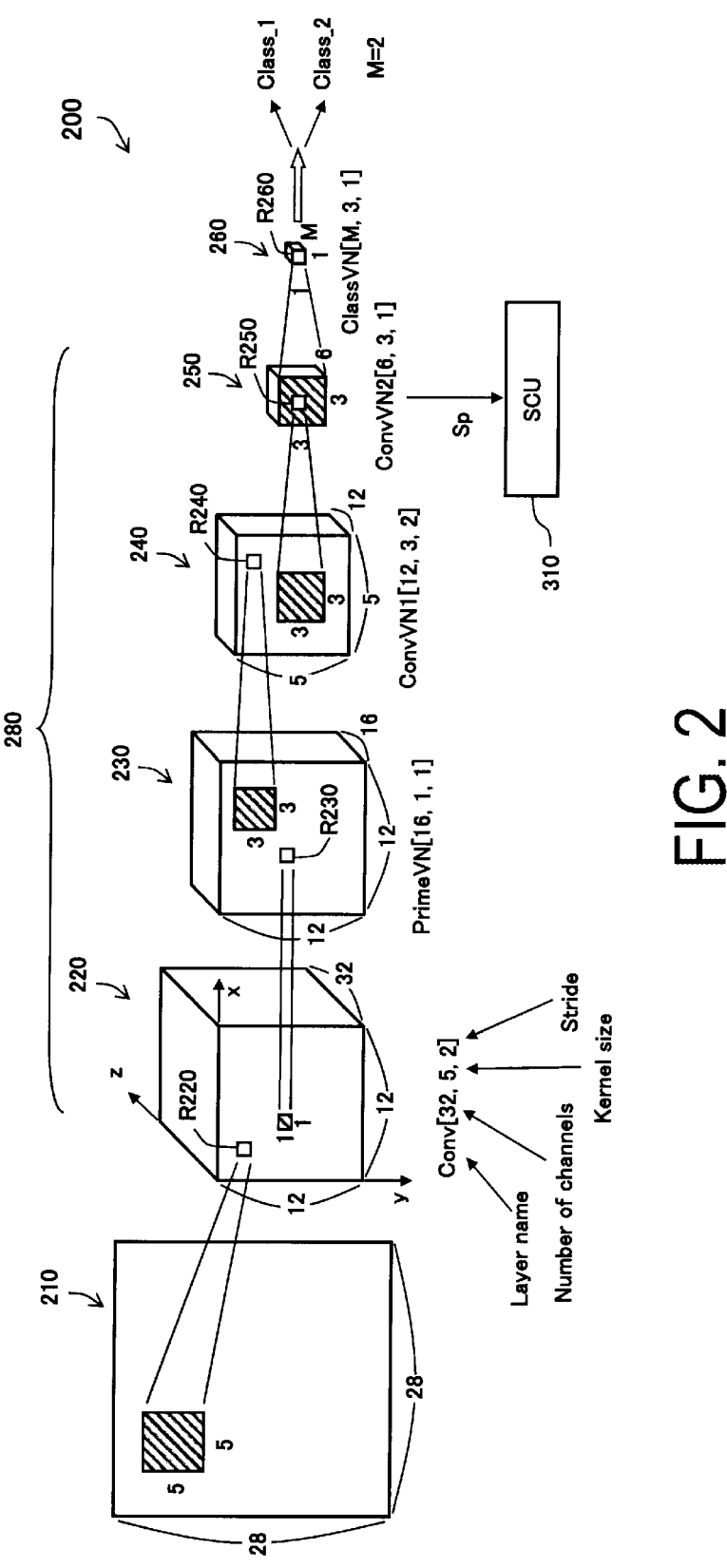
FIG. 2 is an explanatory diagram illustrating a configuration example of a machine learning model.

FIG. 2 is an explanatory diagram illustrating a configuration of the machine learning model 200. The machine learning model 200 has an input layer 210, an intermediate layer 280, and an output layer 260. The intermediate layer 280 includes a convolution layer 220, a primary vector neuron layer 230, a first convolution vector neuron layer 240, and a second convolution vector neuron layer 250. The output layer 260 is also referred to as a "classification vector neuron layer 260". Among those layers, the input layer 210 is the lowermost layer, and the output layer 260 is the uppermost layer. In the following description, the layers in the intermediate layer 280 are referred to as the "Conv layer 220", the "PrimeVN layer 230", the "ConvVN1 layer 240", and the "ConvVN2 layer 250", respectively. The output layer 260 is referred to as the "ClassVN layer 260".

In the example of FIG. 2, the two convolution vector neuron layers 240 and 250 are used. However, the number of convolution vector neuron layers is freely selected, and the vector neuron layers may be omitted. However, it is preferred that one or more convolution vector neuron layers be used.

An image having a size of 28×28 pixels is input into the input layer 210. A configuration of each of the layers other than the input layer 210 is described as follows.

5

Conv layer 220: Conv [32, 5, 2]
PrimeVN layer 230: PrimeVN [16, 1, 1]
ConvVN1 layer 240: ConvVN1 [12, 3, 2]
ConvVN2 layer 250: ConvVN2 [6, 3, 1]
ClassVN layer 260: ClassVN [M, 3, 1]
Vector dimension VD: VD=16

In the description for each of the layers, the character string before the brackets indicates a layer name, and the numbers in the brackets indicate the number of channels, a kernel surface size, and a stride in the stated order. For example, the layer name of the Conv layer 220 is "Conv", the number of channels is 32, the kernel surface size is 5×5, and the stride is two. In FIG. 2, such description is given below each of the layers. A rectangular shape with hatching in each of the layers indicates the kernel surface size that is used for calculating an output vector of an adjacent upper layer. In the present exemplary embodiment, input data is in a form of image data, and hence the kernel surface size is also two-dimensional. Note that the parameter values used in the description of each of the layers are merely examples, and may be changed freely.

Each of the input layer 210 and the Conv layer 220 is a layer configured as a scholar neuron. Each of the other layers 230 to 260 is a layer configured as a vector neuron. The vector neuron is a neuron where an input and an output are in a vector expression. In the description given above, the dimension of an output vector of an individual vector neuron is 16, which is constant. In the description given below, the term "node" is used as a superordinate concept of the scholar neuron and the vector neuron.

In FIG. 2, with regard to the Conv layer 220, a first axis x and a second axis y that define plane coordinates of node arrangement and a third axis z that indicates a depth are illustrated. Further, it is shown that the sizes in the Conv layer 220 in the directions x, y, and z are 12, 12, and 32. The size in the direction x and the size in the direction y indicate the "resolution". The size in the direction z indicates the number of channels. Those three axes x, y, and z are also used as the coordinate axes expressing a position of each node in the other layers. However, in FIG. 2, illustration of those axes x, y, and z is omitted for the layers other than the Conv layer 220.

As is well known, a resolution W1 after convolution is given with the following equation.

$$W1 = Ceil\{(W0 - Wk + 1)/S\} \tag{A1}$$

Here, W0 is a resolution before convolution, Wk is a kernel surface size, S is the stride, and Ceil {X} is a function of rounding up digits after the decimal point in the value X.

The resolution of each of the layers illustrate in FIG. 2 is an example while assuming that the resolution of the input data is 28, and the actual resolution of each of the layers is changed appropriately in accordance with a size of the input data.

The ClassVN layer 260 has M channels. M is the number of classes distinguished from each other in the machine learning model 200. In the present exemplary embodiment, M is two, and two class determination values Class 1 and Class 2 are output. The number M of channels of the ClassVN layer 260 can be set to a freely-selected integer equal to or greater than two.

In FIG. 2, a partial region Rn is further illustrated in each of the layers 220, 230, 240, 250, and 260. The suffix "n" of the partial region Rn indicates the reference symbol of each of the layers. For example, the partial region R220 indicates the partial region in the Conv layer 220. The "partial region Rn" is a region of each of the layers that is specified with a plane position (x, y) defined by a position in the first axis x and a position in the second axis y and includes a plurality of channels along the third axis z. The partial region Rn has a dimension "Width"×"Height"×"Depth" corresponding to the first axis x, the second axis y, and the third axis z. In the present exemplary embodiment, the number of nodes included in one "partial region Rn" is "1×1×the number of depths", that is, "1×1×the number of channels".

As illustrated in FIG. 2, a feature spectrum Sp described later is calculated from an output of the ConvVN2 layer 250. The degree of similarity arithmetic unit 310 uses the feature spectrum Sp, and thus calculates a degree of similarity of the individual training data and other training data. Extraction of the defective data is executed through use of the degree of similarity.

In the present disclosure, a vector neuron layer used for calculation of the degree of similarity is also referred to as a "specific layer". As the specific layer, the vector neuron layers other than the ConvVN2 layer 250 may be used. One or more vector neuron layers may be used, and the number of vector neuron layers is freely selectable. Note that a configuration of the feature spectrum Sp and an arithmetic method of the degree of similarity through use of the feature spectrum Sp are described later.

Figure 3:
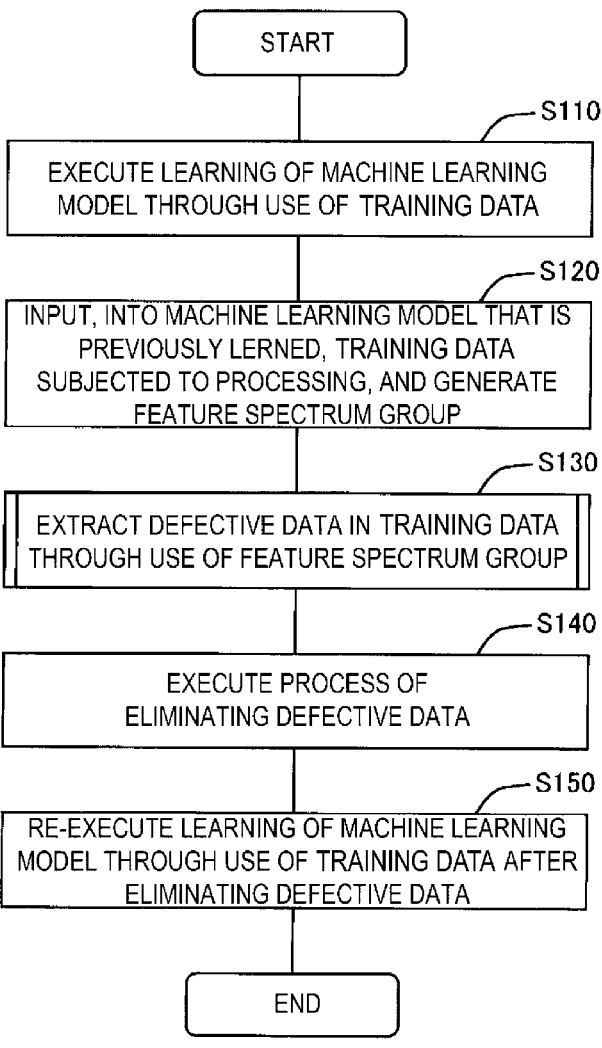
FIG. 3 is a flowchart illustrating an overall procedure of processing extracting defective data.

FIG. 3 is a flowchart illustrating an overall procedure of processing of extracting the defective data. In Step S110, the learning execution unit 112 uses the training data group LT, and thus executes learning of the machine learning model 200. After completion of learning, the machine learning model 200 that is previously leaned is stored in the memory 120.

Figure 4:
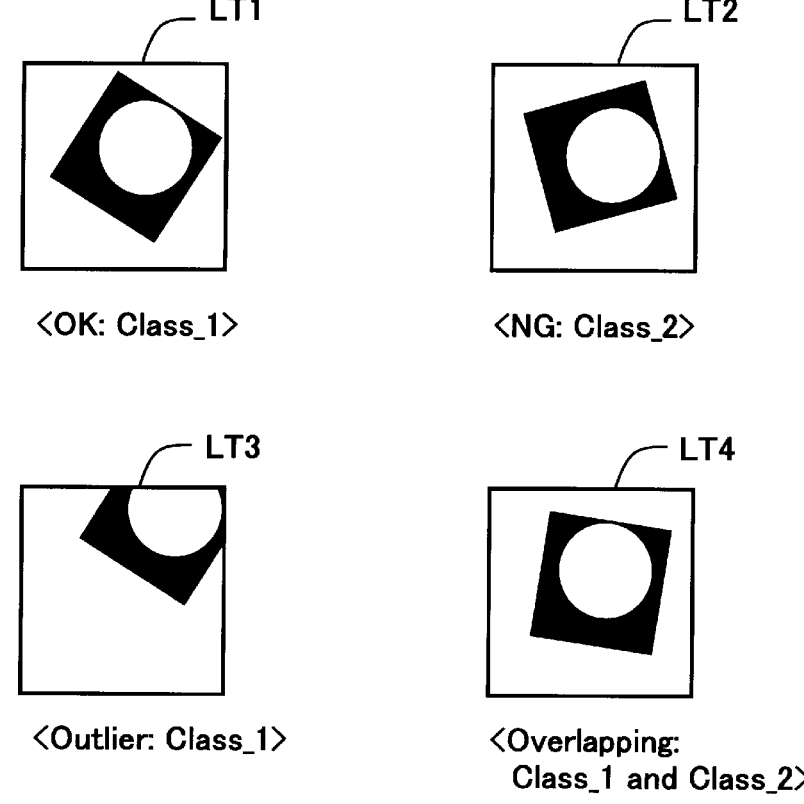
FIG. 4 is an explanatory diagram illustrating an example of training data.

FIG. 4 is an explanatory diagram illustrating an example of the training data. The machine learning model 200 in the present exemplary embodiment utilizes, as an input, an image showing a mounting state of a component on a product, and is configured to output the classification determination values Class 1 and Class 2 indicating a pass and a failure. As the training data, four types of data including pass data LT1, failure data LT2, outlier data LT3, and overlap data LT4 are used. The pass data LT1 and the failure data LT2 are normal training data, and the outlier data LT3 and the overlap data LT4 are defective data.

The pass data LT1 is an image of a state in which a mounting angle of the component falls within a normal range. The failure data LT2 is an image of a state in which the mounting angle of the component falls within an abnormal range, which requires re-fastening. The pass data LT1 is denoted with a label "1". The failure data LT2 is denoted with a label "2". In the present exemplary embodiment, a plurality of images are prepared for each of the pass data LT1 and the failure data LT2. In the present disclosure, the term "class" and the term "label" are synonyms.

The outlier data LT3 is an image of a state in which the mounting angle of the component falls within the normal range, but the position of the component is deviated from the center of the image. The outlier data LT3 includes a plurality of images denoted with the label "1" similarly to the pass data LT1. The overlap data LT4 is an image of the mounting angle in a half-done state, which may be classified into the pass data LT1 and the failure data LT2. The overlap data LT4 includes a plurality of images denoted with the label "1" and a plurality of images denoted with the label "2".

In Step S120, the learning execution unit 112 inputs a plurality of pieces of training data, which are subjected to processing of extracting the defective data, into the machine learning model 200 that is previously leaned, and generates the feature spectrum group GSp. The feature spectrum group GSp is a set of feature spectra, which is described later.

Figure 5:
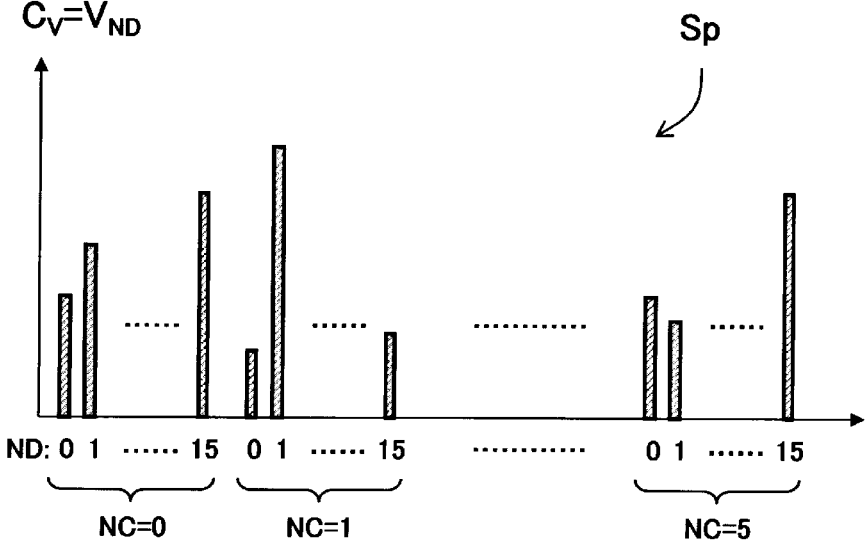
FIG. 5 is an explanatory diagram illustrating a feature spectrum.

FIG. 5 is an explanatory diagram illustrating the feature spectrum Sp obtained by inputting freely-selected input data into the machine learning model 200 that is previously leaned. As illustrated in FIG. 2, in the present exemplary embodiment, the feature spectrum Sp is generate from an output of the ConvVN2 layer 250. The horizontal axis in FIG. 5 indicates positions of vector elements relating to output vectors of a plurality of nodes included in one partial region R250 of the ConvVN2 layer 250. Each of the positions of the vector elements is expressed in a combination of an element number ND of the output vector and the channel number NC at each node. In the present exemplary embodiment, the vector dimension is 16 (the number of elements of the output vector being output from each node), and hence the element number ND of the output vector is denoted with 0 to 15, which is sixteen in total. Further, the number of channels of the ConvVN2 layer 250 is six, and thus the channel number NC is denoted with 0 to 5, which is six in total. In other words, the feature spectrum Sp is obtained by arranging the plurality of element values of the output vectors of each of the vector neurons included in one partial region R250, over the plurality of channels along the third axis z.

The vertical axis in FIG. 5 indicates a feature value $C_V$ at each of the spectrum positions. In this example, the feature value $C_V$ is a value VND of each of the elements of the output vectors. The feature value $C_V$ may be subjected to statistic processing such as centering to the average value 0. Note that, as the feature value $C_V$, a value obtained by multiplying the value VND of each of the elements of the output vectors by a normalization coefficient described later may be used. Alternatively, the normalization coefficient may directly be used. In the latter case, the number of feature values $C_V$ included in the feature spectrum Sp is equal to the number of channels, which is six. Note that the normalization coefficient is a value corresponding to a vector length of the output vector of the node.

The number of feature spectra Sp that can be obtained from an output of the ConvVN2 layer 250 with respect to one piece of input data is equal to the number of plane positions (x, y) of the ConvVN2 layer 250, in other words, the number of partial regions R250, which is nine.

In Step S120, the learning execution unit 112 inputs the training data subjected to process of extracting the defective data, into the machine learning model 200 that is previously leaned, calculates the feature spectra Sp illustrated in FIG. 5, and registers the feature spectra Sp as the feature spectrum group GSp in the memory 120. In the present exemplary embodiment, the training data is subjected to processing of extracting the defective data, and hence the plurality of pieces of training data used in Step S120 are the same as the plurality of pieces of training data used in Step S110. Note that, when the verification data is subjected to processing of extracting the defective data, the plurality of pieces of training data used in Step S120 are different from the plurality of pieces of training data used in Step S110. The following four combinations of first training data that is used in Step S120 and second training data that is an extraction target of the defective data are considered.

(1) Both the first training data and the second training data are training data.

(2) The first training data is training data, and the second training data is verification data.

(3) Both the first training data and the second training data are verification data.

(4) The first training data is verification data, and the second training data is training data.

In the present exemplary embodiment, the first combination among those combinations is used.

FIG. 6 is an explanatory diagram illustrating a configuration of the feature spectrum group GSp. In this example, the feature spectrum group GSp obtained from an output of the ConvVN2 layer 250 is illustrated. Note that registration of a feature spectrum group obtained from an output of at least one vector neuron layer is only required as the feature spectrum group GSp. A feature spectrum group obtained from an output of the ConvVN1 layer 240 or the ClassVN layer 260 may be registered.

Each record in the feature spectrum group GSp includes a parameter k indicating the order of the partial region Rn in the layer, a parameter c indicating the class, a parameter q indicating the data number, and the feature spectrum Sp. The feature spectrum Sp is the same as the feature spectrum Sp in FIG. 5.

The parameter k of the partial region Rn is a value indicating any one of the plurality of partial regions Rn included in the specific layer, in other words, any one of the plane positions (x, y). In a case of the ConvVN2 layer 250, the number of partial regions R250 is nine, and hence k=1 to 9. The parameter c indicating the class is a value indicating any one of the M classes distinguishable in the machine learning model 200. In the present exemplary embodiment, M=2, and hence C=1 to 2. The parameter q of the data number indicates a serial number of the training data belonging to each class. When c=1, the value is 1 to max1. When c=2, the value is 1 to max2. In this manner, the feature spectrum Sp is associated with the class c and the data number q of the training data. Further, the feature spectrum Sp is classified into a class.

In Step S130, the defective data extraction unit 114 uses the feature spectrum group GSp, and thus extracts the defective data from the plurality of pieces of training data. In other words, the defective data extraction unit 114 uses the feature spectrum Sp that is read out from the memory 120, and extracts or detects the outlier data LT3 and the overlap data LT4 from the four types of training data illustrated in FIG. 4. The procedure in Step S130 is described later in detail.

In Step S140, the defective data extraction unit 114 executes processing of eliminating the defective data. For example, the outlier data can be subjected to elimination processing such as processing of removing the outlier data from the training data group and processing of eliminating the outlier data by subjecting the outlier data to data expansion processing and increasing the number of pieces of data. The overlap data can be subjected to elimination processing such as processing of removing the overlap data from the training data group and processing of adding a new class and allocating the overlap data to the new class.

In Step S150, the learning execution unit 112 re-executes learning of the machine learning model 200 through use of the training data group after eliminating the defective data. By executing learning with the training data group without the defective data, the machine learning model 200 with high classification accuracy can be obtained.

Figure 7:
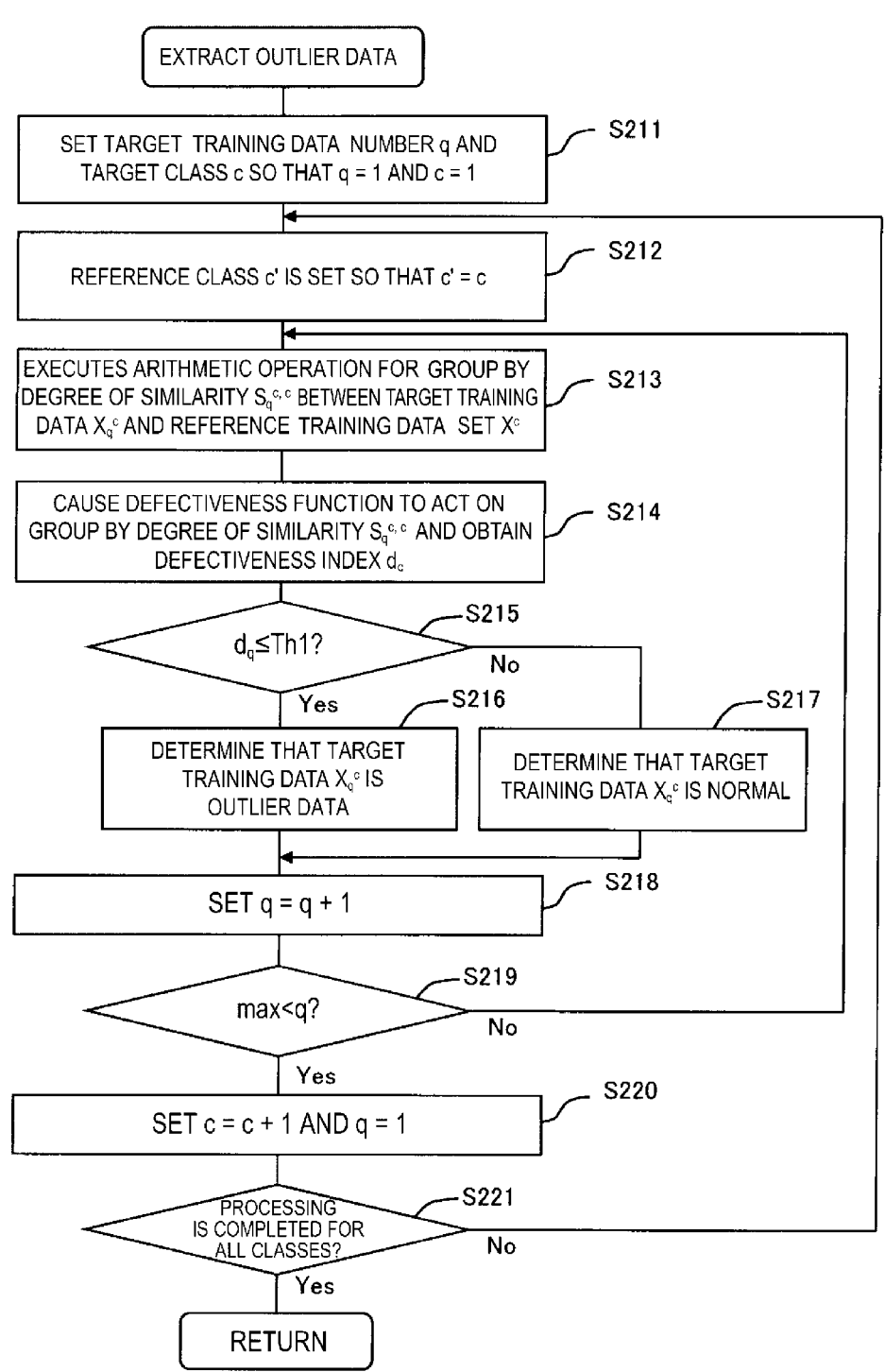
FIG. 7 is a flowchart illustrating a procedure for extracting outlier data.

FIG. 7 is a flowchart illustrating a procedure for extracting the outlier data, and illustrates the procedure in Step S130 in FIG. 3 in a more detailed manner. In Step S211, the defective data extraction unit 114 set the parameter q indicating the data number of the target training data being a determination target and the parameter c indicating the class so that q=1 and c=1. The parameters q and c correspond to the data number q and the class c in the feature spectrum group GSp illustrated in FIG. 5. In the following description, the target training data is referred to as "target training data $x_q^c$", and the class is referred to as a "target class c".

In Step S212, the defective data extraction unit 114 sets a parameter c' indicating a reference class so that c'=c. The "reference class" indicates a class that is referred to for calculating the degree of similarity with the feature spectrum Sp of the target training data $x_q^c$. In the following description, the reference class is referred to as a "reference class c'", and training data belonging to the reference class is referred to as "reference training data". In an arithmetic operation of the degree of similarity, which is described later, a plurality of degrees of similarity between the feature spectrum Sp of the target training data $x_q^c$ and a feature spectrum Sp of a plurality of pieces of reference training data belonging to the reference class c' are calculated. When the outlier data is extracted as the defective data, the reference class c' is set to the same value as the target class c.

In Step S213, the degree of similarity arithmetic unit 310 executes an arithmetic operation for a group by degree of similarity $S_q^{c,\ c}$ between the target training data $x_q^c$ and a reference training data set $X^c$. In the reference symbol $S_q^{c,\ c}$ indicating the degree of similaritygroup by degree of similarity, the subscript "$_q$" indicates the data number q of the target training data, the first "c" in the superscript "$^{c,\ c}$" indicates the target class, and the second "c" therein indicates the reference class. The reference training data set $X^c$ indicates all pieces of training data belonging to the reference class c'=c. In example illustrated in FIG. 6, when the reference class c' is set so that c'=1, the training data having the data number q of 1 to max1 corresponds to the reference training data set $X^c$. The degree of similaritygroup by degree of similarity $S_q^{c,\ c}$ is a set of degrees of similarity $S_q^c$ between the feature spectrum Sp of the target training data $x_q^c$ and the feature spectrum Sp of the individual reference training data. When c'=1, the number of pieces of reference data is max1. Thus, the degree of similaritygroup by degree of similarity $S_q^{c,\ c}$ includes max1 degrees of similarity $S_q^c$. Note that the degree of similarity $S_q^c$ also depends on a data number q' of the reference training data and the reference class c'. However, in the reference symbols of the degree of similarity $S_q^c$, those parameters q' and c' are omitted. The primes "'" given in the parameters q' and c' indicate that the parameters are similar to the parameters q and c illustrated in FIG. 6 described above and are relevant to the reference training data.

In Step S214, the defective data extraction unit 114 causes a defectiveness function on the degree of similaritygroup by degree of similarity $S_q^{c,\ c}$, and thus obtains a defectiveness index $d_q$. The defectiveness index $d_q$ is an index indicating a state whether the target training data $x_q^c$ is defective. The defectiveness function is a function with the degree of similaritygroup by degree of similarity $S_q^{c,\ c}$ as an input and the defectiveness index $d_q$ as an output. The defectiveness function suitable for extraction of the outlier data is determined in consideration of a difference between distribution of the degree of similaritygroup by degree of similarity $S_q^{c,\ c}$ relating to the normal training data and the degree of similaritygroup by degree of similarity $S_q^{c,\ c}$ and the distribution of the degree of similaritygroup by degree of similarity $S_q^{c,\ c}$ relating to the outlier data.

Figure 8:
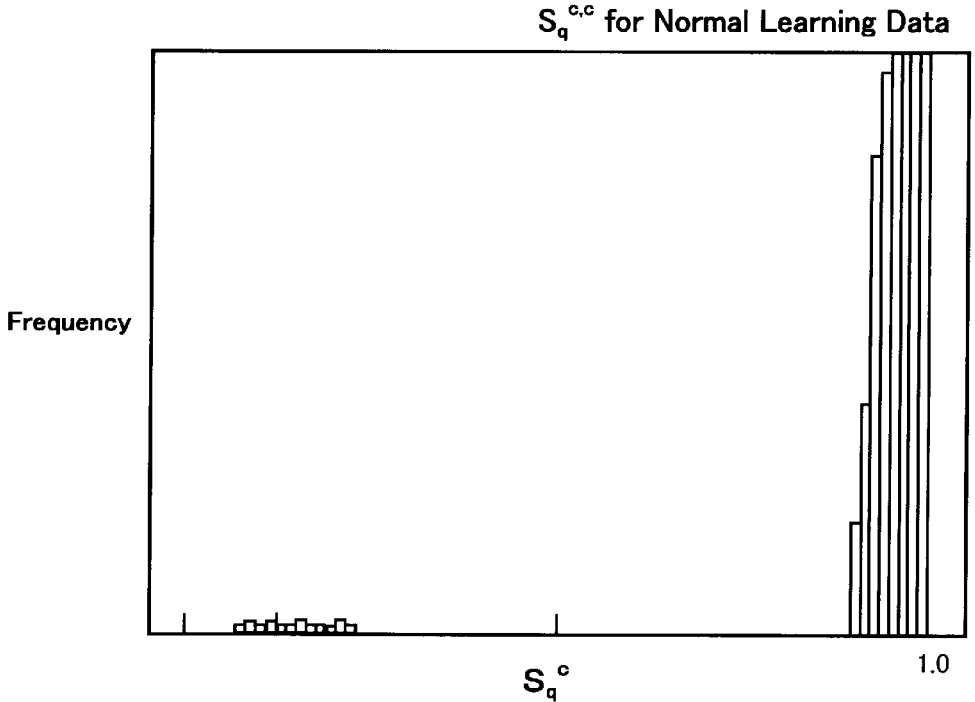
FIG. 8 is an explanatory diagram illustrating a distribution example of a similarity group $S_q^{c, \; c'}$ relating to normal training data.

FIG. 8 is an explanatory diagram illustrating a distribution example of the degree of similaritygroup by degree of similarity $S_q^{c,\ c}$ relating to the normal training data. The horizontal axis indicates the degree of similarity $S_q^c$, and the vertical axis indicates frequency. In the procedure in FIG. 7, the reference class c' is the same as the target class c. Thus, most of the degrees of similarity $S_q^c$ included in the degree of similaritygroup by degree of similarity $S_q^{c,\ c}$ relating to the normal training data are close to 1.0. The reason why some of the degrees of similarity $S_q^c$ have significantly small values is that the target class c includes the outlier data.

Figure 9:
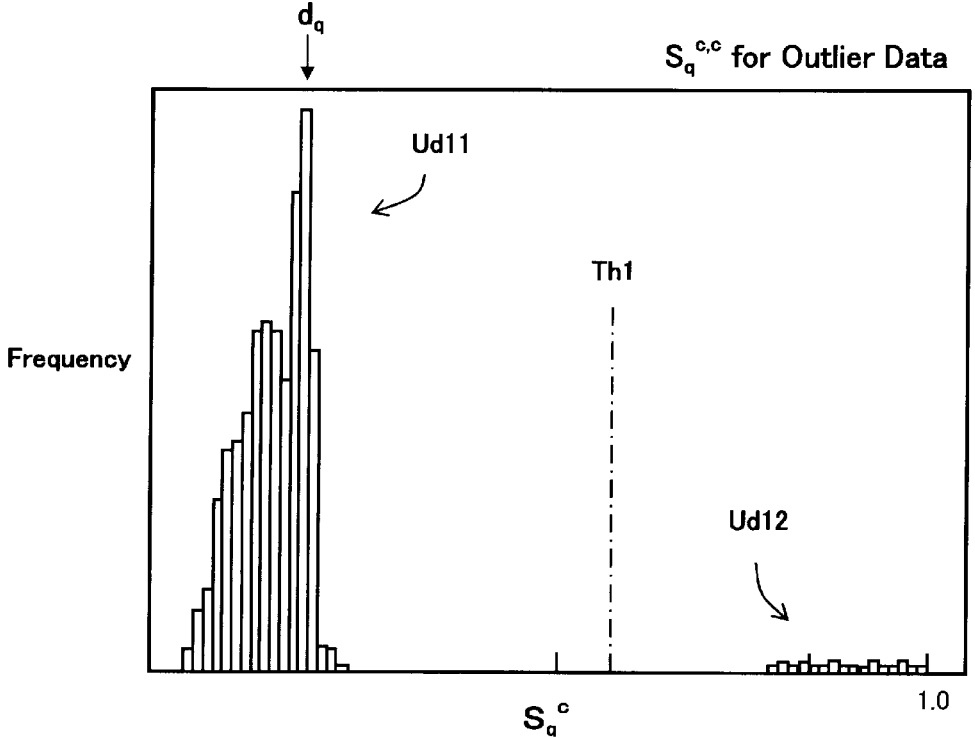
FIG. 9 is an explanatory diagram illustrating a distribution example of the similarity group $S_q^{c, \; c'}$ relating to the outlier data.

FIG. 9 is an explanatory diagram illustrating a distribution example of the degree of similaritygroup by degree of similarity $S_q^{c,\ c}$ relating to the outlier data. The degree of similaritygroup by degree of similarity $S_q^{c,\ c}$ relating to the outlier data has a tendency that most of the degrees of similarity $S_q^c$ are values significantly smaller than 1.0. This is because, when the target training data $x_q^c$ is the outlier data, the target training data $x_q^c$ has features different from common features of the normal training data belonging to the target class c.

As the defectiveness function suitable for processing of extracting the outlier data, any one of the following functions may be used.

(1) Defectiveness Function $f_1$

A defectiveness function $f_1$ is a function for obtaining a statistic representative value of the degree of similaritygroup by degree of similarity $S_q^{c,\ c}$ as the defectiveness index $d_q$. As the statistic representative value, an average value may be used, for example. Note that, in some cases such as processing of extracting the overlap data, which is described later, a maximum value may also be used as the statistic representative value used in the defectiveness function $f_1$.

(2) Defectiveness Function $f_2$

A defectiveness function $f_2$ is a function for obtaining a representative value in a histogram of the degree of similaritygroup by degree of similarity $S_q^{c,\ c}$ as the defectiveness index $d_q$. As the representative value in the histogram, a median value or a most frequent value in the histogram may be used. The representative value in the histogram of the degree of similaritygroup by degree of similarity $S_q^{c,\ c}$ is also one of the statistic representative values of the degree of similaritygroup by degree of similarity $S_q^{c,\ c}$. Thus, the second defectiveness function $f_2$ corresponds to a generic concept of the first defectiveness function $f_1$.

(3) Defectiveness Function $f_3$

A defectiveness function $f_3$ is a function for segmenting the histogram of the degree of similaritygroup by degree of similarity $S_q^{c,\ c}$ into one or more unimodal distributions, selecting a representative unimodal from the one or more unimodal distributions in accordance with a predetermined selection condition, and obtaining, as the defectiveness index $d_q$, a representative value in the selected representative unimodal distribution. The third defectiveness function $f_3$ corresponds to a generic concept of the second defectiveness function $f_2$.

FIG. 9 illustrates an example of the defectiveness index $d_q$ that is obtained through use of the third defectiveness function $f_3$ described above. In this example, first, an Expectation-Maximization Algorithm (EM algorithm) is used to subject the histogram of the degree of similaritygroup by degree of similarity $S_q^{c,\ c}$ to fitting in a mixed Gaussian distribution. With this, a plurality of unimodal distributions Ud11 and Ud12 are obtained. Further, as a selection condition for selecting one representative unimodal distribution from the plurality of unimodal distributions Ud11 and Ud12, conditions C1 and C2 given below are used.

<Condition C1> A ratio of an area of one unimodal distribution to an entire area of the histogram of the degree of similaritygroup by degree of similarity $S_q^{c,\ c}$ is equal to or greater than an area threshold value.

<Condition C2> An average value of the degree of similarity $S_q^c$ is the greatest in the unimodal distribution satisfying the condition C1.

For example, the area threshold value in the above-mentioned condition C1 is set to a value from approximately 5% to approximately 10%. As illustrated in FIG. 9, the condition C1 is used to exclude a unimodal distribution including the degrees of similarity $S_q^c$ close to 1.0. This is because the degree of similaritygroup by degree of similarity $S_q^{c,\ c}$ of the outlier data includes a few degrees of similarity $S_q^c$ close to 1.0. In the example of FIG. 9, the second unimodal distribution Ud12 of the two unimodal distributions Ud11 and Ud12 does not satisfy the condition C1 given above. In view of this, the first unimodal distribution Ud11 is selected as a representative unimodal distribution, and a most frequent value being its representative value is determined as the defectiveness index $d_q$. When the target training data $x_q^c$ is the outlier data, the defectiveness index $d_q$ is a significantly small value.

A condition other than the above-mentioned conditions C1 and C2 may be used a selection condition for selecting one representative unimodal distribution from the plurality of unimodal distributions Ud11 and Ud12. For example, a unimodal distribution with the largest area in the plurality of unimodal distributions may be selected as a representative unimodal distribution. As described above, the histogram of the degree of similaritygroup by degree of similarity $S_q^{c,\ c}$ is segmented into one or more unimodal distributions, and one representative unimodal distribution is selected therefrom. With this, even when the histogram of the degree of similaritygroup by degree of similarity $S_q^{c,\ c}$ has a plurality of peaks, the defectiveness index $d_q$ can be obtained appropriately.

In Step S215 to Step S217, the defective data extraction unit 114 determines whether the target training data $x_q^c$ is the outlier data, based on a result of comparison between the defectiveness index $d_q$ and a first threshold value Th1. Specifically, when do Th1, it is determined that the target training data $x_q^c$ is the outlier data in Step S216. Meanwhile, when $Th1 < d_q$, it is determined that the target training data $x_q^c$ is the normal training data in Step S217. As illustrated in FIG. 9, the first threshold value Th1 is set to be a value that is significantly greater than the defectiveness index $d_q$ obtained when the target training data $x_q^c$ is the outlier data.

In Step S218, the defective data extraction unit 114 increments the target training data number q by one. In Step S219, the defective data extraction unit 114 determines whether the target training data number q exceeds the maximum value, in other words, whether the processing from Step S213 to Step S217 is completed for all the pieces of training data in the target class c. When the processing is not completed for all the pieces of training data in the target class c, the procedure returns to Step S213. Meanwhile, when the processing is completed for all the pieces of training data in the target class c, the procedure proceeds to Step S220.

In Step S220, the defective data extraction unit 114 increments the target class c by one, and sets the target training data number q to 1. In Step S221, the defective data extraction unit 114 determines whether the processing from Step S212 to S219 is completed for all the classes. When the processing is not completed for all the classes, the procedure returns to Step S212. Meanwhile, when the processing is completed for all the classes, the processing in FIG. 7 is completed.

When the processing is executed by following the procedure in FIG. 7 as described above, the outlier data can be extracted or detected from the plurality of pieces of training data.

Figure 10:
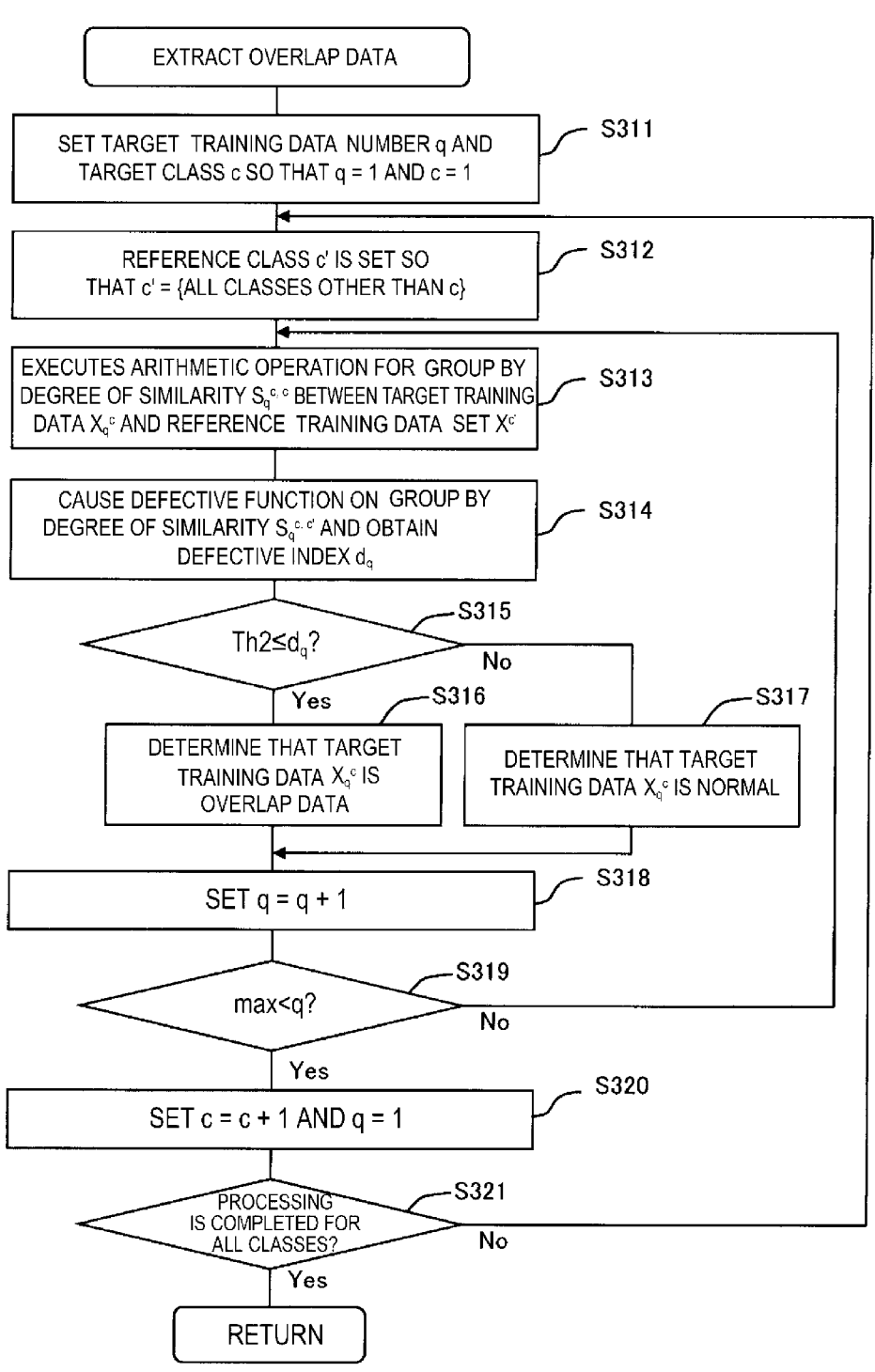
FIG. 10 is a flowchart illustrating a procedure for extracting overlap data.

FIG. 10 is a flowchart illustrating a procedure for extracting the overlap data, and illustrates the procedure in Step S130 in FIG. 3 in a more detailed manner. The procedure in FIG. 10 is executed independently from the procedure in FIG. 7 described above. In the present exemplary embodiment, the processing of extracting the outlier data in the procedure in FIG. 7 and the processing of extracting the overlap data in the procedure in FIG. 10 can be executed separately as the processing in Step S130 in FIG. 3. Those two types of the extraction processing may be executed in a freely-selected order. However, only one of the processing in FIG. 7 and the processing in FIG. 10 may be executed.

Step S311 to Step S321 in FIG. 10 substantially correspond to Step S211 to Step S221 in FIG. 7. More specifically, Step S311 and Step S318 to Step S321 are similar to Step S211 and Step S218 to Step S221, and Step S312 to Step S317 are different from Step S212 to Step S217. In the following description, the contents in Step S312 to Step S317 are described.

In Step S312, the defective data extraction unit 114 sets the reference class c' to {all the classes other than c}. Here, "c" indicates the target class. In the example illustrated in FIG. 6, when c=1, c'=2. Note that, when the number of classes is three or more, it is assumed that the reference class c' includes a plurality of classes.

In Step S313, the degree of similarity arithmetic unit 310 executes an arithmetic operation for the degree of similaritygroup by degree of similarity $S_q^{c,\ c'}$ between the target training data $x_q^c$ and the reference training data set $X^{c'}$. In the example illustrated in FIG. 6, when c=1 and c'=2, the training data of max2 belonging to the class 2 corresponds to the reference training data set $X^{c'}$. Therefore, the degree of similaritygroup by degree of similarity Soc, c' includes max2 degrees of similarity $S_q^{c1}$.

In Step S314, the defective data extraction unit 114 causes the defectiveness function to act on the degree of similaritygroup by degree of similarity $S_q^{c,\ c'}$, and thus obtains the defectiveness index $d_q$. The defectiveness function suitable for extraction of the overlap data is determined in consideration of a difference between the distribution of the degree of similaritygroup by degree of similarity $S_q^{c,\ c'}$ relating to the normal training data and the distribution of the degree of similaritygroup by degree of similarity $S_q^{c,\ c'}$ relating to the overlap data.

Figure 11:
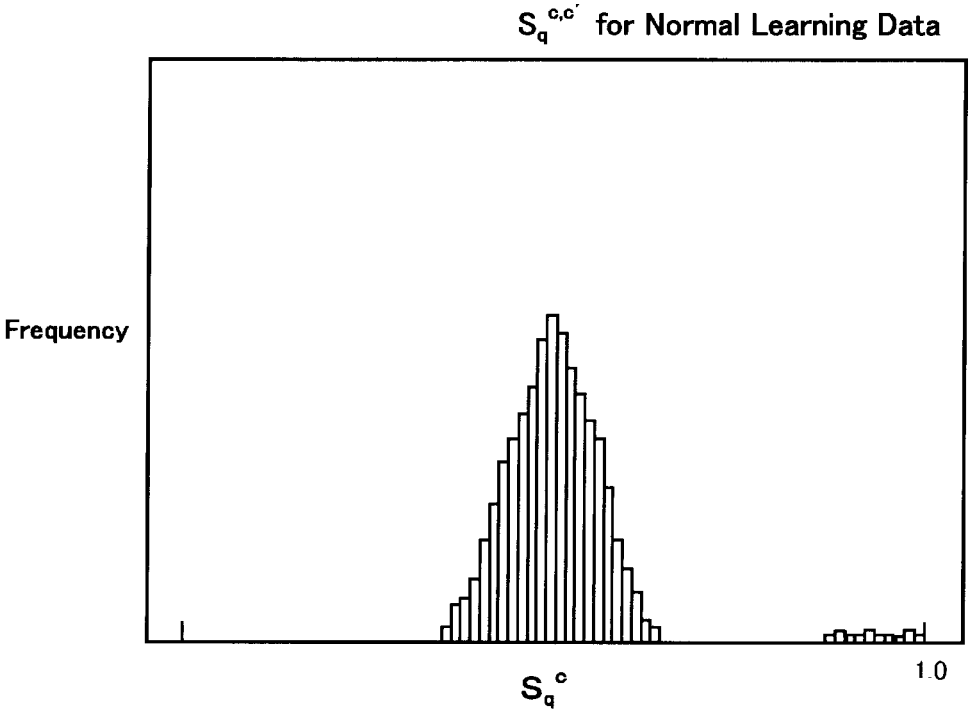
FIG. 11 is an explanatory diagram illustrating a distribution example of a similarity group $S_q^{c, \; c'}$ relating to the normal training data.

FIG. 11 is an explanatory diagram illustrating a distribution example of the degree of similaritygroup by degree of similarity $S_q^{c,\ c'}$ relating to the normal training data. The reference class c' is set for a class other than the target class c, and hence most of the degrees of similarity $S_q^c$ included in the degree of similaritygroup by degree of similarity $S_q^{c,\ c'}$ relating to the normal training data are values that are significantly smaller than 1.0. The reason why a few degrees of similarity $S_q^c$ close to 1.0 are present is that the reference class c' includes the overlap data.

Figure 12:
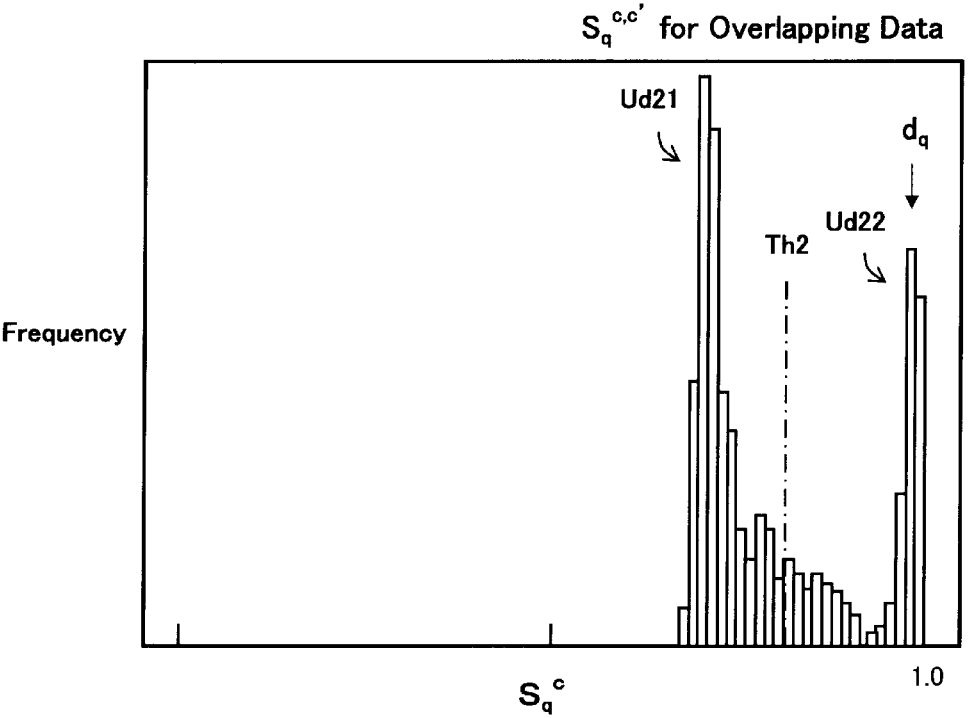
FIG. 12 is an explanatory diagram illustrating a distribution example of the similarity group $S_q^{c, \; c'}$ relating to the overlap data.

FIG. 12 is an explanatory diagram illustrating a distribution example of the degree of similaritygroup by degree of similarity $S_q^{c,\ c'}$ relating to the overlap data. In the degree of similaritygroup by degree of similarity $S_q^{c,\ c'}$ relating to the overlap data, a number of degrees of similarity $S_q^c$ are values close to 1.0. This is because, when the target training data $x_q^c$ is the overlap data, the target training data $x_q^c$ has features similar to features of a class other than the target class c.

The defectiveness function suitable for processing extracting the overlap data, functions that are substantially the same as the defectiveness functions $f_1$ to $f_3$ described with processing of extracting the outlier data may be used. In other words, as the defectiveness function, a function for obtaining a statistic representative value of the degree of similarity group by degree of similarity $S_q^{c,\,c'}$ as the defectiveness index $d_q$ may be used. In the example of FIG. 12, the third defectiveness function $f_3$ described above is used, and a second unimodal distribution Ud22 of two unimodal distributions Ud21 and Ud22 is selected as a representative unimodal distribution. Further, the most frequent value being a representative value in the representative unimodal distribution Ud22 is determined as the defectiveness index $d_q$. Note that the defectiveness function used for processing of extracting the overlap data and the defectiveness function used for processing of extracting the outlier data may be functions that are different from each other.

In Step S315 to Step S317, the defective data extraction unit 114 determines whether the target training data $x_q^c$ is the overlap data, based on a result of comparison between the defectiveness index $d_q$ and the second threshold value Th2. Specifically, when Th2 $d_q$, it is determined that the target training data $x_q^c$ is the overlap data in Step S316. Meanwhile, when $d_q$<Th2, it is determined that the target training data $x_q^c$ is the normal training data in Step S317. As illustrated in FIG. 12, the second threshold value Th2 is set to a value that is sufficiently smaller than the defectiveness index $d_q$ obtained when the target training data $x_q^c$ is the overlap data. Note that the first threshold value Th1 used for processing of extracting the outlier data and the second threshold value Th2 used for processing of extracting the overlap data may be set to the same value, or may be set to values different from each other.

When the processing is executed by following the procedure in FIG. 10 as described above, the overlap data can be extracted or detected from the plurality of pieces of training data.

Note that, in the processing in FIG. 10, the reference class c' is set as {all the classes other than the target class c}, and the defectiveness index $d_q$ is obtained once with respect to {all the classes other than the target class c}. Instead, the reference class c' may be set as {one class other than the target class c}, and the defectiveness index $d_q$ may be obtained with respect to the individual reference class c'. In the latter case, when the defectiveness index $d_q$ is equal to or greater than the second threshold value Th2 in at least one class other than the target class c, it is determined that the target training data $x_q^c$ is the overlap data. Further, when the defectiveness index $d_q$ is less than the second threshold value Th2 in all the classes other than the target class c, it is determined that the target training data $x_q^c$ is not the overlap data.

As described, in the above-mentioned exemplary embodiment, the defective data can be extracted from the training data through use of the defectiveness index do calculated based on the degree of similarity.

B. Method of Calculating Degree of Similarity

For example, any one of the following methods may be employed as the arithmetic method of the degree of similarity described above.

(1) A first arithmetic method M1 for obtaining a degree of similarity without considering correspondence of partial region Rn in the feature spectrum Sp of the target training data $x_q^c$ and the feature spectrum Sp of the reference training data $x_{q'}^{c'}$ (2) A second arithmetic method M2 for obtaining a degree of similarity in the partial region Rn corresponding to the feature spectrum Sp of the target training data $x_q^c$ and the feature spectrum Sp of the reference training data $x_{q'}^{c'}$ (3) A third arithmetic method M3 for obtaining a degree of similarity without considering the partial region Rn at all In the following description, description is sequentially made on methods of calculating a degree of similarity from an output of the ConvVN2 layer 250 while following those arithmetic methods M1, M2, and M3.

Figure 13:
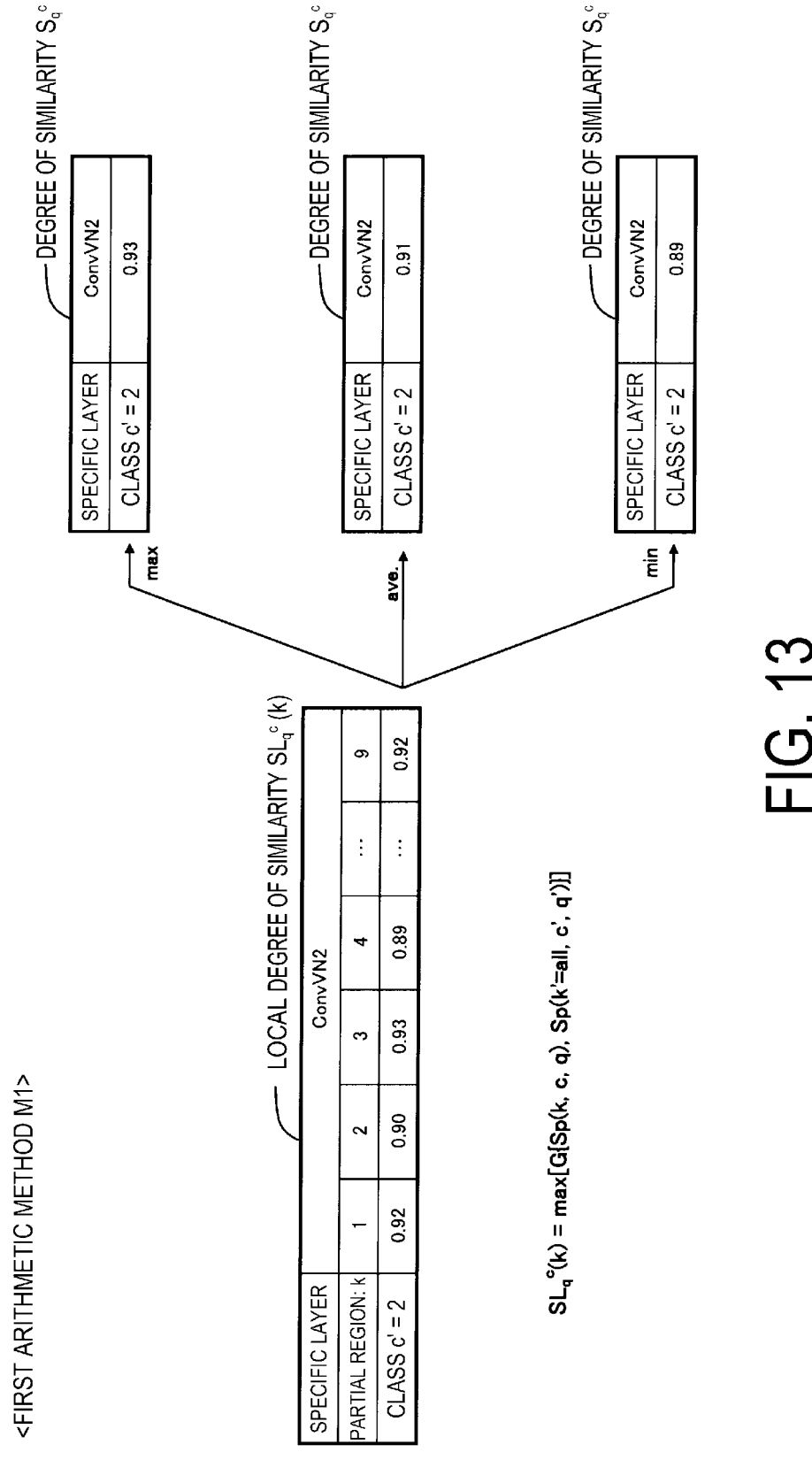
FIG. 13 is an explanatory diagram illustrating a first arithmetic method for obtaining a degree of similarity.

FIG. 13 is an explanatory diagram illustrating the first arithmetic method M1 for obtaining a degree of similarity. In the first arithmetic method M1, first, a local degree of similarity $SL_q^c(k)$ of a partial region k is calculated from an output of the ConvVN2 layer 250 being the specific layer, in accordance with an equation described below. In the machine learning model 200 in FIG. 2, the number of partial regions R250 of the ConvVN2 layer 250 is nine, and hence the parameter k indicating the partial region is 1 to 9. Note that FIG. 13 illustrates an example in which c=1 and c'=2. Any one of three types of the degrees of similarity $S_q^c$, which are illustrated on the right side of FIG. 13, is calculated from the local degree of similarity $SL_q^c(k)$.

In the first arithmetic method M1, the local degree of similarity $SL_q^c(k)$ is calculated through use of the following equation. $SL_q^c(k)=\max[G\{Sp(k, c, q), Sp(k'=all, c', q')\}]$ . . . (B1), where k and k' are parameters indicating the partial region Rn;

c and c' are parameters indicating the target class and the reference class;

q and q' are parameters indicating the data number of the target training data and the data number of the reference training data;

$G\{a, b\}$ is the function for obtaining a degree of similarity between a and b;

Sp(k, c, q) is the feature spectrum obtained from an output of the specified partial region k of the specific layer in accordance with the target training data $x_q^c$;

Sp(k'=all, c', q') is the feature spectrum obtained from an output of all the partial regions k' of the specific layer in accordance with the reference training data $x_{q'}^{c'}$; and max[X] is a logical operation for obtaining a maximum value of the values X.

Note that, as the function $G\{a, b\}$ for obtaining the degree of similarity, for example, an equation for obtaining a cosine degree of similarity or a degree of similarity corresponding to a distance may be used.

The three types of the degrees of similarity $S_q^c$, which are illustrated on the right side of FIG. 13, are obtained by obtaining a maximum value, an average value, or a minimum value of the local degree of similarity $SL_q^c(k)$ of the plurality of partial regions k. An arithmetic operation to be used for obtaining the maximum value, the average value, or the minimum value is set in advance through experimental or empirical observation of a user.

As described above, in the first arithmetic method M1 for obtaining a degree of similarity, (1) the local degree of similarity $SL_q^c(k)$ being a degree of similarity between the feature spectrum Sp(k, c, q) and the feature spectrum Sp(k'=all, c', q') is obtained, the feature spectrum Sp(k, c, q) being obtained from an output of the specified partial region k of the specific layer in accordance with the target training data $x_q^c$, the feature spectrum Sp(k'=all, c', q') being obtained form an output of all the partial regions k' of the specific layer in accordance with the reference training data $x_q^{c'}$, and (2) the degree of similarity $S_q^c$ is obtained by obtaining the maximum value, the average value, or the minimum value of the local degree of similarity $SL_q^c(k)$ for the plurality of partial regions k.

With the first arithmetic method M1, the degree of similarity $S_q^c$ can be obtained in an arithmetic operation and a procedure that are relatively simple.

Figure 14:
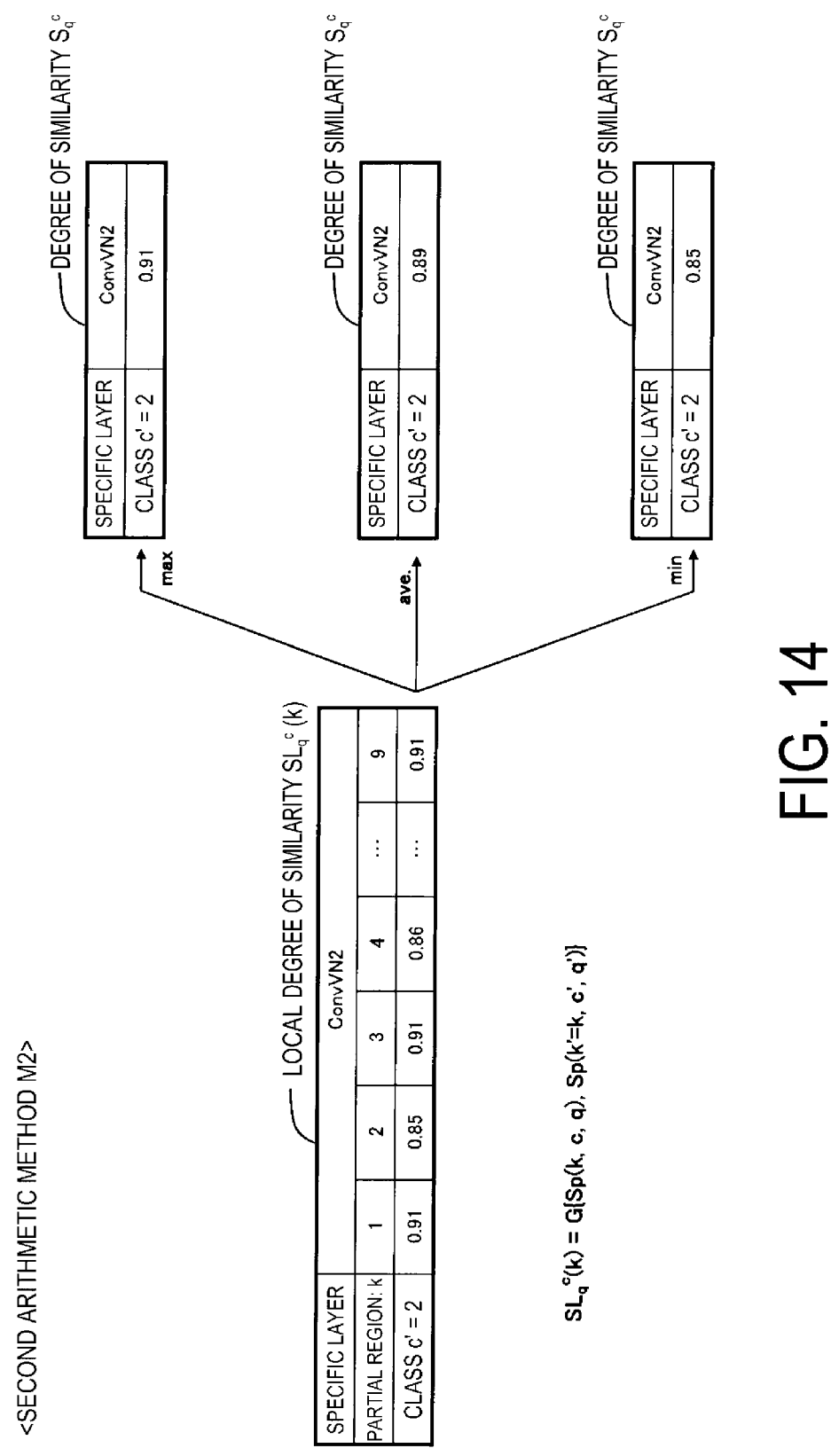
FIG. 14 is an explanatory diagram illustrating a second arithmetic method for obtaining a degree of similarity.

FIG. 14 is an explanatory diagram illustrating the second arithmetic method M2 for obtaining a degree of similarity. In the second arithmetic method M2, the local degree of similarity $SL_q^c(k)$ is calculated through use of the following equation in place of Equation (B1) given above. $SL_q^c(k)=G\{Sp(k, c, q), Sp(k'=k, c', q')\}$ • • • (B2), where Sp(k'=k, c', q') is the feature spectrum obtained by an output of the specified partial region k'=k of the specific layer in accordance with the reference training data $x_q^{c'}$.

In the first arithmetic method M1 described above, the feature spectrum Sp(k'=all, c', q') obtained form an output of all the partial regions k' of the specific layer in accordance with the reference training data $x_{q'}^{c'}$ is used. In contrast, the second arithmetic method M2 only uses the feature spectrum Sp(k'=k, c', q') of the partial region k'=k that is the same as the partial region k of the feature spectrum Sp(k, c, q) obtained in accordance with the target training data $x_q^c$. Other contents of the second arithmetic method M2 are similar to those of the first arithmetic method M1.

In the second arithmetic method M2 for obtaining a degree of similarity, (1) the local degree of similarity $SL_q^c(k)$ being a degree of similarity between the feature spectrum Sp(k, c, q) and the feature spectrum Sp(k'=all, c', q') is obtained, the feature spectrum Sp(k, c, q) being obtained from an output of the specified partial region k of the specific layer in accordance with the target training data $x_q^c$, the feature spectrum Sp(k'=all, c', q') being obtained form an output of the corresponding partial region k'=k of the specific layer in accordance with the reference training data $x_q^{c'}$, and (2) the degree of similarity $S_q^c$ is obtained by obtaining the maximum value, the average value, or the minimum value of the local degree of similarity $SL_q^c(k)$ for the plurality of partial regions k.

With the second arithmetic method M2, the degree of similarity $S_q^c$ can also be obtained in an arithmetic operation and a procedure that are relatively simple.

FIG. 15 is an explanatory diagram illustrating the third arithmetic method M3 for obtaining a degree of similarity. In the third arithmetic method M3, the degree of similarity $S_q^c$ is calculated from an output of the ConvVN2 layer 250 being the specific layer, without obtaining the local degree of similarity $SL_q^c(k)$.

The degree of similarity $S_q^c$ obtained in the third arithmetic method M3 is calculated through use of the following equation.

$$S_q^c=\max[G\{Sp(k=\text{all}, c, q), Sp(k'=\text{all}, c', q')\} \qquad (B3),$$

where

Sp(k=all, c, q) is the feature spectrum obtained from an output of all the partial regions k of the specific layer in accordance with the target training data $x_q^c$; and Sp(k'=all, c', q') is the feature spectrum obtained from an output of all the partial regions k' of the specific layer in accordance with the reference training data $x_q^{c'}$.

As described above, in the third arithmetic method M3 for obtaining a degree of similarity, (1) the degree of similarity $S_q^c$ between the feature spectrum Sp(k=all, c, q) and the feature spectrum Sp(k'=all, c', q') is obtained, the feature spectrum Sp(k=all, c, q) being obtained from an output of all the partial regions k of the specific layer in accordance with the target training data $x_q^c$, the feature spectrum Sp(k'=all, c', q') being obtained form an output of all the partial regions k' of the specific layer in accordance with the reference training data $x_q^{c'}$.

With the third arithmetic method M3, the degree of similarity $S_q^c$ can be obtained in an arithmetic operation and a procedure that are further simple.

Each of the three arithmetic methods M1 to M3 described above is a method for executing an arithmetic operation for a degree of similarity through use of an output of one specific layer. However, an arithmetic operation for a degree of similarity can be executed while one or more of the plurality of vector neuron layers 240, 250, and 260 illustrated in FIG. 2 is regarded as the specific layer. For example, when the plurality of specific layers are used, it is preferred that the minimum value of the plurality of degrees of similarity obtained from the plurality of specific layers be used as a final degree of similarity.

C. Arithmetic Method of Output Vector in Each Layer of Machine Learning Model Arithmetic methods for obtaining an output of each of the layers illustrated in FIG. 2 are as follows.

For each of the nodes of the PrimeVN layer 230, a vector output of the node is obtained by regarding scholar outputs of $1\times1\times32$ nodes of the Conv layer 220 as 32-dimensional vectors and multiplying the vectors by a transformation matrix. In the transformation matrix, a surface size is a $1\times1$ kernel element. The transformation matrix is updated by learning of the machine learning model 200. Note that processing in the Conv layer 220 and processing in the PrimeVN layer 230 may be integrated so as to configure one primary vector neuron layer.

When the PrimeVN layer 230 is referred to as a "lower layer L", and the ConvVN1 layer 240 that is adjacent on the upper side is referred to as an "upper layer L+1", an output of each node of the upper layer L+1 is determined through use of the following equations.

[Mathematical Expression 1]

$$v_{ij} = W_{ij}^L M_i^L \qquad (E1)$$

$$u_j = \sum_i v_{ij} \qquad (E2)$$

$$\alpha_j = F(\|u_j\|) \qquad (E3)$$

$$M_j^{L+1} = a_j \times \frac{1}{\|u_j\|} u_j \qquad (E4)$$

where $M_i^L$ is an output vector of an i-th node in the lower layer L;

$M_j^{L+1}$ is an output vector of a j-th node in the upper layer L+1;

$v_{ij}$ is a predicted vector of the output vector $M_j^{L+1}$;

$W^L_{ij}$ is a predicted matrix for calculating the predicted vector $v_{ij}$ from the output vector $M^L_i$ of the lower layer L;

$u_j$ is a sum vector being a sum of the predicted vector $v_{ij}$, that is, a linear combination;

$a_j$ is an activation value being a normalization coefficient obtained by normalizing a norm $|u_j|$ of the sum vector $u_j$; and F(X) is a normalization function for normalizing X.

For example, as the normalization function F(X), Equation (E3a) or Equation (E3b) given below may be used.

[Mathematical Expression 2]

$$a_j = F(\|u_j\|) = \text{softmax}(\|u_j\|) = \frac{\exp(\beta\|u_j\|)}{\sum_k \exp(\beta\|u_k\|)} \quad \text{(E3a)}$$

$$a_j = F(\|u_j\|) = \frac{\|u_j\|}{\sum_k \|u_k\|} \quad \text{(E3b)}$$

where k is an ordinal number for all the nodes in the upper layer L+1; and $\beta$ is an adjustment parameter being a freely-selected positive coefficient, for example, $\beta=1$.

In Equation (E3a) given above, the activation value $a_j$ is obtained by normalizing the norm $|u_j|$ of the sum vector $u_j$ with the softmax function for all the nodes in the upper layer L+1. Meanwhile, in Equation (E3b), the norm $|u_j|$ of the sum vector $u_j$ is divided by the sum of the norm $|u_j|$ of all the nodes in the upper layer L+1. With this, the activation value $a_j$ is obtained. Note that, as the normalization function F(X), a function other than Equation (E3a) and Equation (E3b) may be used.

For sake of convenience, the ordinal number i in Equation (E2) given above is allocated to each of the nodes in the lower layer L for determining the output vector $M^{L+1}_j$ of the j-th node in the upper layer L+1, and is a value from 1 to n. Further, the integer n is the number of nodes in the lower layer L for determining the output vector $M^{L+1}_j$ of the j-th node in the upper layer L+1. Therefore, the integer n is provided in the equation given below.

$$n = Nk \times Nc \quad \text{(E5)}$$

Here, Nk is a kernel surface size, and Nc is the number of channels of the PrimeVN layer 230 being a lower layer. In the example of FIG. 2, Nk=9 and Nc=16. Thus, n=144.

One kernel used for obtaining an output vector of the ConvVN1 layer 240 has 144 (3×3×16) elements, each of which has a surface size being a kernel size of 3×3, and has a depth being the number of channels in the lower layer of 16. Each of the elements is a prediction matrix $W^L_{ij}$. Further, in order to generate output vectors of 12 channels of the ConvVN1 layer 240, 12 kernel pairs are required. Therefore, the number of predication matrices $W^L_{ij}$ of the kernels used for obtaining output vectors of the ConvVN1 layer 240 is 1, 728 (144× 12). Those prediction matrices $W^L_{ij}$ are updated by learning of the machine learning model 200.

As understood from Equation (E1) to Equation (E4) given above, the output vector $M^{L+1}_j$ of each of the nodes in the upper layer L+1 is obtained by the following arithmetic operation.

(A) the predicted vector $v_{ij}$ is obtained by multiplying the output vector $M^L_i$ of each of the nodes in the lower layer L by the prediction matrix $W^L_{ij}$;

(b) the sum vector $u_j$ being a sum of the predicted vectors $v_{ij}$ of the respective nodes in the lower layer L, which is a linear combination, is obtained;

(c) the activation value $a_j$ being a normalization coefficient is obtained by normalizing the norm $|u_j|$ of the sum vector $u_j$; and (d) the sum vector $u_j$ is divided by the norm $|u_j|$, and is further multiplied by the activation value $a_j$.

Note that the activation value $a_j$ is a normalization coefficient that is obtained by normalizing the norm $|u_j|$ for all the nodes in the upper layer L+1. Therefore, the activation value $a_j$ can be considered as an index indicating a relative output intensity of each of the nodes among all the nodes in the upper layer L+1. The norm used in Equation (E3), Equation (E3a), Equation (E3b), and Equation (4) is an L2 norm indicating a vector length in a general example. In this case, the activation value $a_j$ corresponds to a vector length of the output vector $M^{L+1}_j$. The activation value $a_j$ is only used in Equation (E3) and Equation (E4) given above, and hence is not required to be output from the node. However, the upper layer L+1 may be configured so that the activation value $a_j$ is output to the outside.

A configuration of the vector neural network is substantially the same as a configuration of the capsule network, and the vector neuron in the vector neural network corresponds to the capsule in the capsule network. However, the arithmetic operation with Equation (E1) to Equation (E4) given above, which are used in the vector neural network, is different from an arithmetic operation used in the capsule network. The most significant difference between the two arithmetic operations is that, in the capsule network, the predicted vector $v_{ij}$ in the right side of Equation (E2) given above is multiplied by a weight and the weight is searched by repeating dynamic routing for a plurality of times. Meanwhile, in the vector neural network of the present exemplary embodiment, the output vector $M^{L+1}_j$ is obtained by calculating Equation (E1) to Equation (E4) given above once in a sequential manner. Thus, there is no need of repeating dynamic routing, and the arithmetic operation can be executed faster, which are advantageous points. Further, the vector neural network of the present exemplary embodiment has a less memory amount, which is required for the arithmetic operation, than the capsule network. According to an experiment conducted by the inventor of the present disclosure, the vector neural network requires approximately ⅓ to ½ of the memory amount of the capsule network, which is also an advantageous point.

The vector neural network is similar to the capsule network in that a node with an input and an output in a vector expression is used. Therefore, the vector neural network is also similar to the capsule network in that the vector neuron is used. Further, in the plurality of layers 220 to 260, the upper layers indicate a feature of a larger region, and the lower layers indicate a feature of a smaller region, which is similar to the general convolution neural network. Here, the "feature" indicates a feature included in input data to the neural network. In the vector neural network or the capsule network, an output vector of a certain node contains space information indicating information relating to a spatial feature expressed by the node. In this regard, the vector neural network or the capsule network are superior to the general convolution neural network. In other words, a vector length of an output vector of the certain node indicates an existence probability of a feature expressed by the node, and the vector direction indicates space information such as a feature direction and a scale. Therefore, vector directions of output vectors of two nodes belonging to the same layer indicate positional relationships of the respective features. Alternatively, it can also be said that vector directions of output vectors of the two nodes indicate feature variations. For example, when the node corresponds to a feature of an "eye", a direction of the output vector may express variations such as smallness of an eye and an almond-shaped eye. It is said that, in the general convolution neural network, space information relating to a feature is lost due to pooling processing. As a result, as compared to the general convolution neural network, the vector neural network and the capsule network are excellent in a function of distinguishing input data.

The advantageous points of the vector neural network can be considered as follows. In other words, the vector neural network has an advantageous point in that an output vector of the node expresses features of the input data as coordinates in a successive space. Therefore, the output vectors can be evaluated in such a manner that similar vector directions show similar features. Further, even when features contained in input data are not covered in teaching data, the features can be interpolated and can be distinguished from each other, which is also an advantageous point. In contrast, in the general convolution neural network, disorderly compaction is caused due to pooling processing, and hence features in input data cannot be expressed as coordinates in a successive space, which is a drawback.

An output of each of the node in the ConvVN2 layer 250 and the ClassVN layer 260 are similarly determined through use Equation (E1) to Equation (E4) given above, and detailed description thereof is omitted. A resolution of the ClassVN layer 260 being the uppermost layer is 1×1, and the number of channels thereof is M.

An output of the ClassVN layer 260 is converted into the plurality of class determination values Class 1 and Class 2 for the plurality of classes. In general, those class determination values are values obtained through normalization with the softmax function. Specifically, for example, a vector length of an output vector is calculated from the output vector of each of the nodes in the ClassVN layer 260, and the vector length of each of the nodes is further normalized with the softmax function. By executing this arithmetic operation, a determination value for each of the classes can be obtained. As described above, the activation value $a_j$ obtained by Equation (E3) given above is a value corresponding to a vector length of the output vector $M^{L+1}_j$, and is normalized. Therefore, the activation value $a_j$ of each of the nodes in the ClassVN layer 260 may be output, and may be used directly as a determination value of each of the classes.

In the exemplary embodiment described above, as the machine learning model 200, the vector neural network that obtains an output vector by an arithmetic operation with Equation (E1) to Equation (E4) given above is used. Instead, the capsule network disclosed in each of U.S. Pat. No. 5,210,798 and WO 2019/083553 may be used.
Other Aspects:

The present disclosure is not limited to the exemplary embodiment described above, and may be implemented in various aspects without departing from the spirits of the disclosure. For example, the present disclosure can also be achieved in the following aspects. Appropriate replacements or combinations may be made to the technical features in the above-described exemplary embodiment which correspond to the technical features in the aspects described below to solve some or all of the problems of the disclosure or to achieve some or all of the advantageous effects of the disclosure. Additionally, when the technical features are not described herein as essential technical features, such technical features may be deleted appropriately.

(1) According to a first aspect of the present disclosure, there is provided a method of extracting unsuitable and defective data from a plurality of pieces of training data used for learning of a machine learning model for classifying input data into a plurality of classes. The machine learning model is configured as a vector neural network having a plurality of vector neuron layers. The method includes (a) inputting each of the plurality of pieces of training data into the machine learning model that is previously leaned, obtaining a feature spectrum from an output of a specific layer of the machine learning model, and classifying, into classes, the feature spectra corresponding respectively to the plurality of pieces of training data, and (b) selecting target training data from the plurality of pieces of training data, and determining whether the target training data is the defective data. (b) includes (b1) selecting a reference class from the plurality of classes, (b2) calculating a plurality of degrees of similarity between the feature spectrum corresponding to the target training data and a plurality of the feature spectra belonging to the reference class, (b3) applying, to the plurality of degrees of similarity, a defectiveness function that is determined in advance, and calculating a defectiveness index with respect to the target training data, and (b4) determining whether the target training data is the defective data, based on a result of comparison between the defectiveness index and a threshold value.

With this method, through use of the defectiveness index calculated based on the degree of similarity, the defective data can be extracted from the training data.

(2) In the method described above, the defectiveness function may be a function for obtaining, as the defectiveness index, a statistic representative value of the plurality of degrees of similarity.

With this method, the defectiveness index can be obtained as appropriate.

(3) In the method described above, the defectiveness function may be a function for obtaining, as the defectiveness index, an average value or a maximum value of the plurality of degrees of similarity.

With this method, the defectiveness index can be obtained as appropriate.

(4) In the method described above, the defectiveness function may be a function for obtaining, as the defectiveness index, a representative value in a histogram of the plurality of degrees of similarity.

With this method, the defectiveness index can be obtained as appropriate.

(5) In the method described above, (b3) may include segmenting the histogram of the plurality of degrees of similarity into one or more unimodal distributions, and obtaining, as the defectiveness index, a representative value in a representative unimodal distribution that is selected from the one or more unimodal distributions in accordance with a selection condition that is determined in advance.

With this method, the defectiveness index can be obtained as appropriate from the histogram having a plurality of peaks.

(6) In the method described above, the selection condition may include a first condition that a ratio of one unimodal distribution area to an entire area of the histogram is equal to or greater than an area threshold value, and a second condition that, in the unimodal distribution satisfying the first condition, the average value of the plurality of degrees of similarity is the greatest.

With this method, the unimodal distribution for obtaining the defectiveness index can be selected as appropriate.

(7) In the method described above, the defective data may include outlier data, the reference class may be a class corresponding to a target class to which the target training data belongs, and (b4) may include determining the target training data is the outlier data when the defectiveness index is equal to or less than the threshold value, and determining the target training data is not the outlier data when the defectiveness index exceeds the threshold value.

With this method, the outlier data can be extracted as the defective data.

(8) In the method described above, the defective data may include overlap data approximating to training data in another class different from a class to which the defective data belongs, the reference class may be a class different from a target class to which the target training data belongs, and (b4) may include determining the target training data is the overlap data when the defectiveness index is equal to or greater than the threshold value, and determining the target training data is not the overlap data when the defectiveness index is less than the threshold value.

With this method, the overlap data can be extracted as the defective data.

(9) In the method described above, the specific layer may have a configuration in which a vector neuron arranged in a plane defined with two axes including a first axis and a second axis is arranged as a plurality of channels along a third axis being a direction different from the two axes. The feature spectrum may be any one of (i) a first type of a feature spectrum obtained by arranging a plurality of element values of an output vector of a vector neuron at one plane position in the specific layer, over the plurality of channels along the third axis, (ii) a second type of a feature spectrum obtained by multiplying each of the plurality of element values of the first type of the feature spectrum by an activation value corresponding to a vector length of the output vector, and (iii) a third type of a feature spectrum obtained by arranging the activation value at one plane position in the specific layer, over the plurality of channels along the third axis.

With this method, the feature spectrum can easily be obtained.

(10) According to a second aspect of the present disclosure, there is provided an information processing device configured to execute processing for extracting unsuitable and defective data from a plurality of pieces of training data used for learning of a machine learning model for classifying input data into a plurality of classes. The information processing device includes a memory configured to store a machine learning model configured as a vector neural network having a plurality of vector neuron layers, and a processor configured to execute an arithmetic operation using the machine learning model. The processor executes processing of (a) inputting each of the plurality of pieces of training data into the machine learning model that is previously leaned, obtaining a feature spectrum from an output of a specific layer of the machine learning model, and classifying, into classes, the feature spectra corresponding respectively to the plurality of pieces of training data, and (b) selecting target training data from the plurality of pieces of training data, and determining whether the target training data is the defective data. (b) includes (b1) selecting a reference class from the plurality of classes, (b2) calculating a plurality of degrees of similarity between the feature spectrum corresponding to the target training data and a plurality of the feature spectra belonging to the reference class, (b3) applying, to the plurality of degrees of similarity, a defectiveness function that is determined in advance, and calculating a defectiveness index with respect to the target training data, and (b4) determining whether the target training data is the defective data, based on a result of comparison between the defectiveness index and a threshold value.

(11) According to a third aspect of the present disclosure, there is provided a non-transitory computer-readable storage medium storing a computer program for causing a processor to execute processing of extracting unsuitable and defective data from a plurality of pieces of training data used for learning of a machine learning model for classifying input data into a plurality of classes. The computer program causes the processor to execute processing of (a) inputting each of the plurality of pieces of training data into the machine learning model that is previously leaned, obtaining a feature spectrum from an output of a specific layer of the machine learning model, and classifying, into classes, the feature spectra corresponding respectively to the plurality of pieces of training data, and (b) selecting target training data from the plurality of pieces of training data, and determining whether the target training data is the defective data. (b) includes (b1) selecting a reference class from the plurality of classes, (b2) calculating a plurality of degrees of similarity between the feature spectrum corresponding to the target training data and a plurality of the feature spectra belonging to the reference class, (b3) applying, to the plurality of degrees of similarity, a defectiveness function that is determined in advance, and calculating a defectiveness index with respect to the target training data, and (b4) determining whether the target training data is the defective data, based on a result of comparison between the defectiveness index and a threshold value.

The present disclosure may be achieved in various forms other than the above-mentioned aspects. For example, the present disclosure can be implemented in forms including a computer program for achieving the functions of the defective data extraction device, and a non-transitory storage medium storing the computer program.

What is claimed is:

1. A method comprising:

executing a process of extracting unsuitable and defective data from a plurality of pieces of training data, wherein the plurality of pieces of training data is used for learning of a machine learning model for classifying input data into a plurality of classes, and the machine learning model is configured as a vector neural network having a plurality of vector neuron layers;

inputting each of the plurality of pieces of training data into the machine learning model that is previously learned;

obtaining a feature spectrum from an output of a specific layer of the machine learning model;

classifying, into the plurality of classes, the feature spectrum corresponding respectively to the plurality of pieces of training data;

selecting target training data from the plurality of pieces of training data;

selecting a reference class from the plurality of classes;

calculating a plurality of degrees of similarity between the feature spectrum corresponding to the target training data and a plurality of feature spectra belonging to the reference class;

applying, to the plurality of degrees of similarity, a defectiveness function that is determined in advance;

calculating a defectiveness index with respect to the target training data; and determining whether the target training data is the defective data, based on a result of comparison between the defectiveness index and a threshold value, wherein the defectiveness function is a function for obtaining, as the defectiveness index, a representative value in a histogram of the plurality of degrees of similarity.

2. The method according to claim 1, wherein the application of the defectiveness function includes:

segmenting the histogram of the plurality of degrees of similarity into one or more unimodal distributions; and obtaining, as the defectiveness index, a representative value in a representative unimodal distribution that is selected from the one or more unimodal distributions in accordance with a selection condition that is determined in advance.

3. The method according to claim 2, wherein the selection condition includes:

a first condition that a ratio of one unimodal distribution area to an entire area of the histogram is equal to or greater than an area threshold value; and a second condition that, in the unimodal distribution satisfying the first condition, an average value of the plurality of degrees of similarity is the greatest.

4. The method according to claim 1, wherein the defective data includes outlier data, the reference class is a class corresponding to a target class to which the target training data belongs, and the determination whether the target training data is the defective data includes:

determining the target training data is the outlier data when the defectiveness index is equal to or less than the threshold value; and determining the target training data is not the outlier data when the defectiveness index exceeds the threshold value.

5. The method according to claim 1, wherein the defective data includes overlap data approximating to training data in another class different from a class to which the defective data belongs, the reference class is a class different from a target class to which the target training data belongs, and the determination whether the target training data is the defective data includes:

determining the target training data is the overlap data when the defectiveness index is equal to or greater than the threshold value; and determining the target training data is not the overlap data when the defectiveness index is less than the threshold value.

6. The method according to claim 1, wherein the specific layer has a configuration in which a vector neuron arranged in a plane defined with two axes including a first axis and a second axis is arranged as a plurality of channels along a third axis being a direction different from the two axes, and the feature spectrum is any one of:

a first type of the feature spectrum obtained by arranging a plurality of element values of an output vector of the vector neuron at one plane position in the specific layer, over the plurality of channels along the third axis;

a second type of the feature spectrum obtained by multiplying each of the plurality of element values of the first type of the feature spectrum by an activation value corresponding to a vector length of the output vector; and a third type of the feature spectrum obtained by arranging the activation value at the one plane position in the specific layer, over the plurality of channels along the third axis.

7. A non-transitory computer-readable medium having stored thereon, computer-executable instructions which, when executed by computer, cause the computer to execute operations, the operations comprising:

executing a process of extracting unsuitable and defective data from a plurality of pieces of training data, wherein the plurality of pieces of training data is used for learning of a machine learning model for classifying input data into a plurality of classes; and the machine learning model is configured as a vector neural network having a plurality of vector neuron layers;

inputting each of the plurality of pieces of training data into the machine learning model that is previously learned;

obtaining a feature spectrum from an output of a specific layer of the machine learning model;

classifying, into the plurality of classes, the feature spectrum corresponding respectively to the plurality of pieces of training data;

selecting target training data from the plurality of pieces of training data;

selecting a reference class from the plurality of classes;

calculating a plurality of degrees of similarity between the feature spectrum corresponding to the target training data and a plurality of feature spectra belonging to the reference class;

applying, to the plurality of degrees of similarity, a defectiveness function that is determined in advance;

calculating a defectiveness index with respect to the target training data; and determining whether the target training data is the defective data, based on a result of comparison between the defectiveness index and a threshold value, wherein the defectiveness function is a function for obtaining, as the defectiveness index, a representative value in a histogram of the plurality of degrees of similarity.

8. A method, comprising:

executing a process of extracting unsuitable and defective data from a plurality of pieces of training data, wherein the plurality of pieces of training data is used for learning of a machine learning model for classifying input data into a plurality of classes, and the machine learning model is configured as a vector neural network having a plurality of vector neuron layers;

inputting each of the plurality of pieces of training data into the machine learning model that is previously learned;

obtaining a feature spectrum from an output of a specific layer of the machine learning model, wherein the specific layer has a configuration in which a vector neuron is arranged in a plane defined with two axes including a first axis and a second axis, the specific layer is arranged as a plurality of channels along a third axis which is a direction different from the two axes, and the feature spectrum is any one of:

a first type of the feature spectrum obtained by arranging a plurality of element values of an output vector of the vector neuron at one plane position in the specific layer, over the plurality of channels along the third axis;

a second type of the feature spectrum obtained by multiplying each of the plurality of element values of the first type of the feature spectrum by an activation value corresponding to a vector length of the output vector; and a third type of the feature spectrum obtained by arranging the activation value at the one plane position in the specific layer, over the plurality of channels along the third axis;

classifying, into the plurality of classes, the feature spectrum corresponding respectively to the plurality of pieces of training data;

selecting target training data from the plurality of pieces of training data;

selecting a reference class from the plurality of classes;

calculating a plurality of degrees of similarity between the feature spectrum corresponding to the target training data and a plurality of feature spectra belonging to the reference class;

applying, to the plurality of degrees of similarity, a defectiveness function that is determined in advance;

calculating a defectiveness index with respect to the target training data; and determining whether the target training data is the defective data, based on a result of comparison between the defectiveness index and a threshold value.

9. The method according to claim 8, wherein the defectiveness function is a function for obtaining, as the defectiveness index, a statistic representative value of the plurality of degrees of similarity.

10. The method according to claim 8, wherein the defectiveness function is a function for obtaining, as the defectiveness index, an average value or a maximum value of the plurality of degrees of similarity.

11. The method according to claim 8, wherein the defectiveness function is a function for obtaining, as the defectiveness index, a representative value in a histogram of the plurality of degrees of similarity.

12. The method according to claim 8, wherein the application of the defectiveness function includes:

segmenting a histogram of the plurality of degrees of similarity into one or more unimodal distributions; and obtaining, as the defectiveness index, a representative value in a representative unimodal distribution that is selected from the one or more unimodal distributions in accordance with a selection condition that is determined in advance.

13. The method according to claim 12, wherein the selection condition includes:

a first condition that a ratio of one unimodal distribution area to an entire area of the histogram is equal to or greater than an area threshold value; and a second condition that, in the unimodal distribution satisfying the first condition, an average value of the plurality of degrees of similarity is the greatest.

14. The method according to claim 8, wherein the defective data includes outlier data, the reference class is a class corresponding to a target class to which the target training data belongs, and the determination whether the target training data is the defective data includes:

determining the target training data is the outlier data when the defectiveness index is equal to or less than the threshold value; and determining the target training data is not the outlier data when the defectiveness index exceeds the threshold value.

15. The method according to claim 8, wherein the defective data includes overlap data approximating to training data in another class different from a class to which the defective data belongs, the reference class is a class different from a target class to which the target training data belongs, and the determination whether the target training data is the defective data includes:

determining the target training data is the overlap data when the defectiveness index is equal to or greater than the threshold value; and determining the target training data is not the overlap data when the defectiveness index is less than the threshold value.

\* \* \* \* \*